US007245282B2

(12) United States Patent
Jones

(10) Patent No.: US 7,245,282 B2
(45) Date of Patent: Jul. 17, 2007

(54) ADDRESSING MULTISTABLE NEMATIC LIQUID CRYSTAL DEVICES

(75) Inventor: John C. Jones, Malvern (GB)

(73) Assignee: ZBD Displays Limited, Malvern (GB)

( * ) Notice: Subject to any disclaimer, the term of this patent is extended or adjusted under 35 U.S.C. 154(b) by 207 days.

(21) Appl. No.: 11/120,185

(22) Filed: May 3, 2005

(65) Prior Publication Data

US 2005/0285831 A1 Dec. 29, 2005

Related U.S. Application Data

(63) Continuation-in-part of application No. 10/363,465, filed as application No. PCT/GB01/03956 on Sep. 5, 2001, now Pat. No. 7,068,250.

(30) Foreign Application Priority Data

Sep. 7, 2000 (GB) ................................ 0022055.8

(51) Int. Cl.
*G02F 1/141* (2006.01)

(52) U.S. Cl. ............................ 345/94; 345/87; 345/98; 345/564; 349/76; 349/77; 349/169

(58) Field of Classification Search .................. 345/87, 345/94, 97, 98, 564, 566; 349/76, 77, 169, 349/179, 184, 185
See application file for complete search history.

(56) References Cited

U.S. PATENT DOCUMENTS

| | | | | |
|---|---|---|---|---|
| 5,283,564 | A | 2/1994 | Katakura et al. | |
| 5,796,459 | A | 8/1998 | Bryan-Brown et al. | |
| 5,963,186 | A | 10/1999 | Hughes et al. | |
| 6,057,817 | A * | 5/2000 | Ono et al. | 345/94 |
| 6,104,368 | A * | 8/2000 | Bonnett et al. | 345/94 |
| 6,122,031 | A * | 9/2000 | Terada et al. | 349/155 |
| 6,784,968 | B1 * | 8/2004 | Hughes et al. | 349/179 |

FOREIGN PATENT DOCUMENTS

| | | |
|---|---|---|
| EP | 0744041 | 10/1997 |
| GB | 2314446 | 12/1997 |
| WO | 92 00546 A | 1/1992 |

(Continued)

OTHER PUBLICATIONS

J.C. Jones, et al.; "Zenithal Bistable Devices: Towards the Electronic Book with a Simple LCD;" ZBD Displays Ltd., Malvern, WORCS., UK; DERA, Malvern WORCS., UK; IDW '00; pp. 301-304.

(Continued)

*Primary Examiner*—Bipin Shalwala
*Assistant Examiner*—Vincent E. Kovlaick
(74) *Attorney, Agent, or Firm*—Nixon & Vanderhye P.C.

(57) ABSTRACT

A method of addressing bistable nematic liquid crystal devices is provided. The method is suitable for implementation using commercially available STN drivers. The method involves applying one of at least two data waveforms simultaneously to each column electrode whilst an active row waveform is applied to an active row and a non active row waveform is applied to all other rows. The resultant waveform at the pixels on the active row comprises a blanking portion sufficient to cause the liquid crystal material to blank, irrespective of which data waveform is applied, immediately followed by a discriminating portion which allows for selective latching depending on the data waveform applied.

13 Claims, 23 Drawing Sheets

FOREIGN PATENT DOCUMENTS

Figure 1:
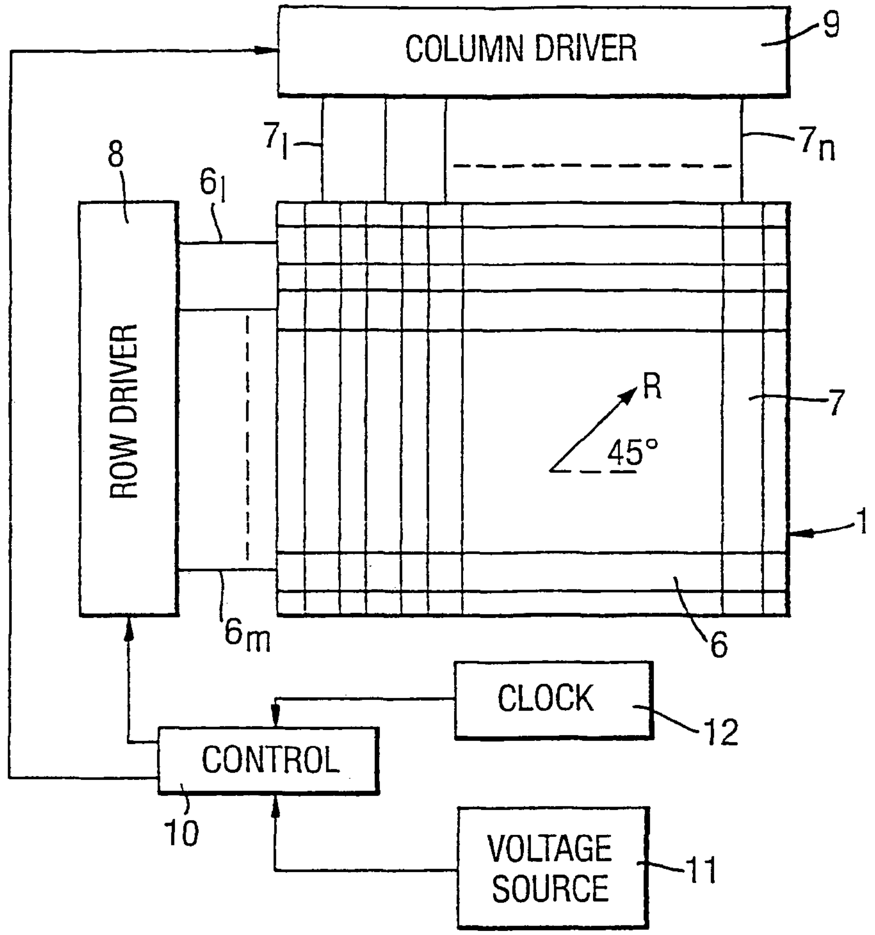

| | | |
|---|---|---|
| WO | 97 14990 A | 4/1997 |
| WO | 00 52671 A | 9/2000 |

OTHER PUBLICATIONS

E. L. Wood, et al.; "11.2: Zenithal Bistable Device (ZBD™) Suitable for Portable Applications;" SID 00 DIGEST; pp. 124-127.

J.C. Jones, et al.; "Greyscale in Zenithal Bistable LCD: The Route to Ultra-Low Power Colour Displays;" ZBD Displays Ltd., Malvern, UK; Proceedings of the 7th Asian Symposium on Information Display (ASID '02) ISBN: 981-04-6983-7; pp. 205-208.

E. L. Wood, et al.; "5.1: Large Area, High Resolution Portable ZBD Display;" ZBD Displays Ltd., Malvern, UK; SID 02 DIGEST; pp. 22-25.

Surguy P W H et al: "The Jorers/Alvey Ferroelectric Multiplexing Scheme" Ferroelectrics, New York, NY, US, vol. 122, No. ¼, 1991, pp. 63-79, XP000603231 p. 67, paragraph 4-p. 68, line 3: figure 3.

* cited by examiner

| | |
|---|---|
| Pulse Number 1 | y=0 |
| Pulse Number 2 | y=2 |
| Pulse Number 3 | y=4 |
| Pulse Number 4 | y=8 |
| Pulse Number 5 | y=12 |
| Pulse Number 6 | y=16 |
| Pulse Number 7 | y=20 |
| Pulse Number 8 | y=24 |

Figure 36

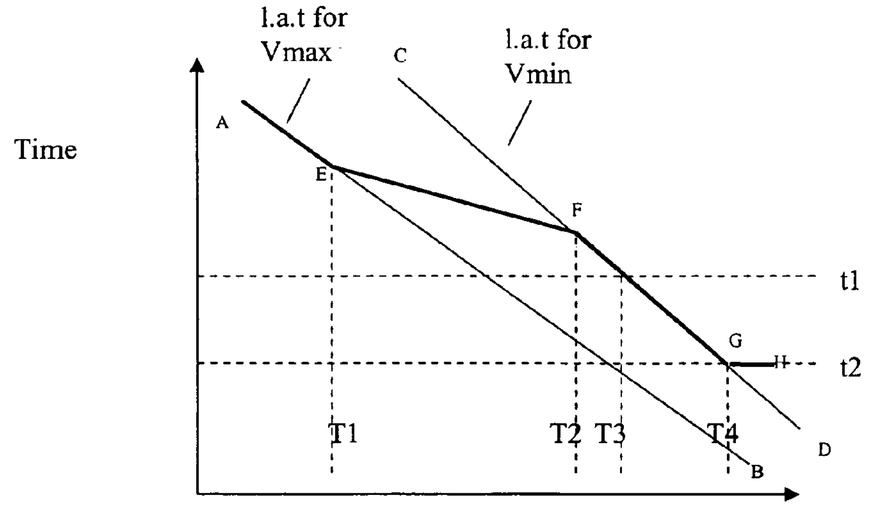

Figure 37

V0..V5

| M = L | Active Column (V5) | Inactive Column (V3) |
|---|---|---|
| **Active Row (V0)** | V0-V5 | V0-V3 |
| **Inactive Row (V4)** | V4-V5 | V4-V3 |

| M = H | Active Column (V0) | Inactive Column (V2) |
|---|---|---|
| **Active Row (V5)** | V5-V0 | V5-V2 |
| **Inactive Row (V1)** | V1-V0 | V1-V2 |

Vs & Vd

| M = L | Active Column (0) | Inactive Column (2Vd) |
|---|---|---|
| **Active Row (Vs+Vd)** | Vs+Vd | Vs-Vd |
| **Inactive Row (Vd)** | +Vd | -Vd |

| M = H | Active Column (Vs+Vd) | Inactive Column (Vs-Vd) |
|---|---|---|
| **Active Row (0)** | -(Vs+Vd) | -(Vs-Vd) |
| **Inactive Row (Vs)** | -Vd | Vd |

Example voltages

| M = L | Active Column (0) | Inactive Column (6V) |
|---|---|---|
| **Active Row (22V)** | +22V | +16V |
| **Inactive Row (3V)** | +3V | -3V |

| M = H | Active Column (22V) | Inactive Column (16V) |
|---|---|---|
| **Active Row (0V)** | -22V | -16V |
| **Inactive Row (19V)** | -3V | +3V |

ADDRESSING MULTISTABLE NEMATIC LIQUID CRYSTAL DEVICES

This application is a Continuation-in-Part of application Ser. No. 10/363,465, filed Mar. 4, 2003, now U.S. Pat. No. 7,068,250, which is the U.S. national phase of international application PCT/GB01/03956, filed in English on 5 Sep. 2001, which designated the PCT/GB91/03956 claims priority to GB Application No. 0022055.8 filed 7 Sep. 2000. The entire contents of these applications are incorporated herein by reference.

This invention relates to the addressing of nematic liquid crystal displays having at least two stable states, in particular bistable nematic liquid crystal devices, in which the selection between stables states is made using pulses of opposite polarity. For the purposes of this specification the term nematic (which includes long pitch chiral nematic materials) shall be taken to include long pitch cholesteric materials.

One known multistable device is the bistable nematic liquid crystal described in International patent application WO97/14990 and is known as a zenithal bistable device (ZBD™). This device comprises a thin layer of nematic or long pitch cholesteric material contained between cell walls. One or both cell walls are surface treated with a surface alignment grating structure to permit liquid crystal molecules to adopt either of two pretilt angles in the same azimuthal plane at the surface. Opposite surfaces may have pretilt in differing azimuthal planes. The cell can be electrically switched between these two states by application of voltage pulses of suitable polarity which couples with the polarisation of the liquid crystal molecule induced by the surface such as the flexoelectric polarisation. By use of suitable polarisers, dyes etc the two states may be observed as dark and light states allowing information to be displayed which will persist after removal of a voltage until electrically switched to the other state. Various schemes of addressing this type of liquid crystal device are described in patent application WO00/52671.

Another further zenithal bistable nematic device is described in International Patent Application WO97/14990 which uses a liquid crystal material with a negative dielectric anisotropy.

Conventional monostable liquid crystal display devices, such as twisted nematic (TN) or supertwisted nematic (STN) devices, are addressed using rms addressing methods. Applying a suitable electric field across the cell causes the liquid crystal molecules to adopt a particular configuration which differs from the configuration of the monostable state induced by the surface alignment. When the rms voltage falls below a certain level the liquid crystal material relaxes to the monostable state. Various well known addressing schemes are used which rely on the ac rms voltage values. This is convenient because liquid crystal materials deteriorate when the applied voltage has a net dc for any substantial duration.

Another type of bistable device is the ferroelectric liquid crystal display (FLCD) which exhibits bistability in the smectic phase with suitable cell wall surface alignment treatments. In such a device the application of a pulse of suitable polarity, amplitude and duration will cause the liquid crystal material to switch from one state into the other. For instance a suitable positive pulse will cause the material to switch to a first state and application of a suitable negative pulse will cause the material to switch to the other state. Usually the cell configuration is such that one state is dark (or black) and the other is light (or white). However again the liquid crystal material degenerates under application of dc voltages and therefore most known FLCD addressing schemes tend to ensure that there is a net zero dc voltage, at least within the frame time. Also it is wished to avoid a net dc effect forcing one state to be preferred. A net zero dc voltage is where the integration of the applied voltages over time leads to a sum of zero.

There are many known schemes for addressing FLCDs. Due to the fact that switching of bistable nematic devices of the type described above also depends upon the polarity of the applied pulse many addressing schemes for ferroelectric devices may be suitable for addressing such bistable nematic liquid crystal devices.

There are many schemes of ‘line at a time’ addressing where data is continuously applied to one set of electrodes during the time taken to write an entire frame and the other set of electrodes is addressed one at a time. Two general types of line at a time addressing schemes are known, two field addressing and blanking.

In two field addressing a strobe waveform is applied to the row electrodes whilst a data waveform is applied is applied to the column electrodes. For bistable devices there are usually two different data waveforms, conveniently called ON and OFF, which may conveniently be a pulse of $+V_d$ for one time slot and $-V_d$ for another time period and its inverse, i.e. $-V_d$ followed by $+V_d$. This allows for ease of dc balancing of the data waveforms within the time taken to address a single line. This is essential to prevent latching of a pixel into an unwanted state following several lines with the same data waveform. The data waveforms may also be designed to give appropriate latching, with three or more slots. For example, one time slot at $+V_d$, one at $-V_d$ followed by one time slot of zero (0) volts, and the inverse waveform $-V_d$, $+V_d$, 0.

As used herein the terms row and columns are not intended to restrict the waveforms to application to a particular set of electrodes. Rather the terms are used simply to distinguish the two sets of electrodes and could be consistently interchanged throughout. Also, other electrodes are possible, from alphanumeric characters, to axial and radial circular electrodes.

In the simplest schemes a unipolar strobe pulse of one polarity is applied to each row in turn whilst one of the two data waveforms is applied simultaneously to the columns. The voltage levels are chosen such that combination of the strobe pulse and data ON or data OFF waveforms will either result in the liquid crystal material adopting the light state configuration or not. However this will only generally set all the pixels required to be light to adopt the light state. It is then necessary to readdress all the pixels using a unipolar strobe pulse of the opposite polarity in combination with the opposite data waveforms to set all the pixels that should be in the dark state to be in that state. Using strobe pulses of opposite polarity but equal amplitude and duration achieves dc balance. Other strobe schemes such as bipolar waveforms are also known.

One problem with this scheme however is the need to address the entire display twice to write one frame which doubles the time taken to address the entire display.

Another known scheme employs what is termed a blanking pulse. Here a pulse of sufficient voltage and duration is supplied to the/a row or rows ahead of the strobe pulse. The blanking pulse is adapted to be sufficient to ensure that all the pixels in that row adopt one state, usually the dark state, regardless of what, if any, data waveform might be being applied to the columns. Subsequently it is only necessary to cause those pixels desired to be light to adopt the light state using an appropriate strobe waveform. Hence the total addressing time of the display may be reduced. However, blanking to the dark state inherently means that the pixels intended to be in the light state for that frame are in the wrong state for the time between the blanking pulse and the subsequent addressing of that pixel. Thus the overall brightness of the device is reduced. Of course blanking to the light state is possible but again this deleteriously affects the display contrast.

Another problem with using a blanking pulse is the effect on operating window. The term operating window describes the range voltage levels and duration of pulses within which the display will operate correctly, despite temperature, cell gap, alignment variations that occur across a display panel (or from panel to panel in a production process). Obviously it is desired that the blanking pulse is sufficient to cause the liquid crystal material to adopt one particular configuration, irrespective of what data pulse may be supplied during the blanking process. However the strobe waveform needs to allow for discrimination between states depending on what data waveform is supplied. Incorrect design of the blank can limit the operating window for the strobe waveform.

Ideally the blanking pulse together with the strobe waveform should give dc balance. GB2, 314, 446 describes improvements in blanking pulses for FLCDs.

U.S. Pat. No. 5,963,186 and GB 2, 262, 831 describe a scheme wherein the strobe pulse may extend beyond the line address time for a particular row into a following row or rows. As used herein the term line address time shall be taken to mean the duration in which data specific for that particular row is being applied to the columns, i.e. often the time taken to write the appropriate ON or OFF waveforms to the columns that are appropriate for that particular row. U.S. Pat. No. 5,963,186 teaches that the strobe can be extended beyond the line address time into the following lines to give a total effective resultant which gives good switching properties but without causing incorrect switching. The effective line address time of a display addressed in this manner can be shortened resulting in a faster frame update rate or the voltage levels need to operate the display at the required rate may be reduced.

It should be noted that with multistable devices such as described the addressing schemes are designed such that the liquid crystal material remains in the desired stable configuration when the field is removed. This will be referred to hereinafter as latching. Application of a field will still cause the liquid crystal director profile to alter for a short period due to the rms effect of the applied field. However this does not necessarily cause the material to latch into a different stable state. Hence latching will be used the indicate that the resultant waveform at a particular pixel was sufficient to ensure that it remains in the desired stable state.

It is an object of the invention to provide schemes for addressing multistable nematic liquid crystal devices which are optimised therefor and which offer faster, lower voltage or wider operating windows than conventional schemes.

According to the present invention therefore there is provided a scheme for addressing a multistable nematic liquid crystal device having a layer of nematic liquid crystal material disposed between two cell walls and row and column electrodes disposed on the cell walls to form an addressable matrix of pixels, and having a cell wall surface treatment such that the liquid crystal material is latchable between at least two stable molecular configurations upon application of appropriate voltage pulses comprising the steps of applying a strobe waveform to each row electrode in a sequence and applying one of at least two data waveforms, to each column electrode simultaneously wherein each data waveform has a duration equal to the line address time and has a zero net dc value and wherein the strobe waveform has a net zero dc value over a whole frame time and comprises a blanking portion, which in combination with any data waveform will cause the liquid crystal material to adopt a first particular state, immediately preceding a discriminating portion, which in combination with one data waveform will cause the liquid crystal material to remain in the first stable state and in combination with the another data waveform to latch to the another stable state, characterised in that only one strobe waveform is applied to each row when addressing a particular frame and in that during the line address time wherein the appropriate data waveform is applied to each column for the pixels of a particular row at least part of the blanking portion and at least part of the discriminating portion is applied to that row.

Conveniently the liquid crystal material is latchable between two stable molecular configurations, i.e. the device is bistable. In this case there are preferably two data waveforms.

Multistable devices with more than two states could be used however. Here there could be a plurality of data waveforms, the number of different data waveforms being equal to the number of stable states. Multistable devices offer advantages in being able to produce greyscale. Multistability may be produced by having a pixel separated into two or more domains, each having a different grating producing bistability but latchable at different applied electrical energies. Therefore a data pulse may latch all of the pixel into one state or the other or latch part (one domain) of the pixel into one state whilst keeping the other part in the other state.

Alternatively a single grating could be used which allows for more than one stable configuration.

Having the blanking portion of the strobe waveform immediately precede the discriminating portion reduces the amount of time that pixels may spend in the wrong latched state. Indeed at least part of the blanking portion is applied during the line address time for that row, i.e. the time at which the appropriate data waveform is being written, and as such the time that the pixel may spend in the wrongly latched state is minimised.

By incorporating a blanking portion as part of the strobe waveform there is no need for two field addressing. Also having the blanking portion immediately preceding the discriminating portion in the line addressing time maximises the possible addressing speed in other ways as will be described.

It might be helpful here to clarify what is meant by the various terms used. As mentioned a strobe waveform is applied to the row electrodes and data waveforms are applied to all column electrodes. The time taken to write an entire row is known as the line address time, and this is equivalent to the duration of the data waveform. The duration of the strobe waveform may be greater than the line address time. However a particular part of the strobe waveform is designed to coincide with the appropriate data waveforms for that row and it is this part of the strobe waveform that is referred to in the context of the line address time. The term blanking portion is taken to mean a part of the strobe waveform where a voltage is maintained of one polarity (although the actual voltage level may vary) and is sufficient to cause latching of the liquid crystal into one particular state irrespective of what data waveform might be applied to the column during the duration of the blanking portion. In the present invention, the blanking portion must be at least partly contained within the line address time. The term discriminating portion is then a part of the strobe waveform of opposite polarity to the blanking portion which also must be at least partly within the line address time. It is noted that obviously the data appropriate for that row will only be applied to columns during the line address time for that row and so the part of the discriminating portion that occurs within the line address time is what selects which state the liquid crystal latches into. However extending the discriminating portion beyond the line address time may aid the latching response as will be described later.

In one embodiment the whole of the blanking portion of the strobe waveform is applied to a row during the line address time when the appropriate data waveform is applied to each column.

Zenithal bistable devices may be designed to have an asymmetry in their latching response as will be described later. Thus it is easier to latch from a first state to the second than from the second to the first. The concept of ease of latching is thought of as less energy is required to latch, i.e. the product of the voltage and duration of pulse required to latch is lower. The present invention exploits this fact and enables a suitable strobe waveform to be applied that allows blanking to occur during the first part of the line address time, whatever data waveform is applied but allows discrimination between the two stable states towards the end of the line address time depending upon which data waveform is applied and still maintain dc balance.

Therefore the strobe waveform can be made to be the same duration as the data waveform in a single field addressing scheme.

The present invention is equally applicable to azimuthal bistable devices however such as are disclosed in European patent EP0744041 and U.S. Pat. No. 5,796,459. Any multistable liquid crystal devices where the latching between states depends on the polarity of the applied voltage can benefit from the present invention.

Conveniently the data waveforms may comprise a first waveform comprising a positive pulse followed by a negative pulse of equal duration and equal but opposite magnitude and a second waveform which is the inverse of the first waveform. The data waveform may also comprise a period of zero voltage.

In one embodiment of the present invention, the strobe waveform comprises a waveform which comprises a first pulse and a second pulse, the first and second pulse being of equal duration and equal and opposite magnitude. The polarity of the first pulse will depend on a number of factors including the liquid crystal material used, the cell geometry and the way in which the device is used as will be well understood by person skilled in the art.

A system wherein the data waveform is a two slot simple waveform and a single row waveform is applied during a frame address time, that waveform also being a two slot simple waveform offers advantages in speed and ease of addressing and the corresponding electronics needed to drive a cell.

Apart from causing blanking a pulse of opposite polarity immediately preceding the discriminating pulse of the strobe waveform can also make latching easier. When a field of a particular polarity is applied to a liquid crystal cells ions present in the liquid crystal material will start to migrate to the appropriate electrodes. Obviously the effect of the applied field will be to cause the ions to migrate to reduce the effect of the field. Thus the actual field across the cell will decay over time. When a field of the alternate polarity is then applied however the ions will tend to migrate in the opposite direction. The ions are relatively slow moving however and so immediately on reversal of the field the ionic effects will actually serve to enhance the field and so the effective applied voltage will be greater. Thus preceding the discriminating pulse with a pulse of opposite polarity will actually cause the discriminating pulse to initially have a larger effective amplitude. This will therefore enhance the latching characteristic of the liquid crystal material allowing for faster latching or a lower voltage to be used.

In another embodiment therefore the discriminating portion of the strobe waveform is immediately preceded by the blanking portion of opposite polarity and the blanking portion of the strobe pulse is applied to the row electrode before the appropriate data waveform is applied thereto, i.e. the blanking portion if pre-extended before the line address time into previous lines.

Note that the principle of using a pulse of opposite polarity before a discriminating potion would apply even if the pulse did not actually cause blanking. Therefore another aspect of this invention is the use of a strobe waveform having a discriminating portion of one polarity, immediately preceded by a first portion of opposite polarity, the length of the first portion extending beyond the line address time into previous lines. This could be used where a separate blanking pulse has already been applied earlier, or where two field operation is preferred. Conveniently the strobe waveform also has a dc balancing portion which immediately precedes the blanking portion. As the modulus of the voltage time product of the blanking portion may exceed the modulus of the voltage time product for the discriminating portion there is a need to dc balance the overall strobe waveform and a convenient way would be to have a pulse of appropriate polarity and duration precede the blanking portion of the strobe waveform. The dc balancing portion could be separate but as will be described later the rms effects of having the dc balancing portion immediately precede the blanking portion lead to this embodiment being preferred. The DC poling (or ionic) effect of the dc balancing pulse, also helps ensure the blanking action of the blanking portion of the waveform if the balancing pulse immediately precedes the blanking portion.

The longer the blanking portion the greater the ionic effect will be and so faster latching times and/or lower latching voltages will be possible. There is a duration longer than which this dc poling effect will have no further advantage, and may begin to cause some deleterious effects in the liquid crystal material. This will depend on the material used, and other variables such as the temperature of the display.

The duration of the discriminating portion of the strobe waveform may extend beyond the line address time during which the appropriate data waveform is applied to the columns into subsequent lines.

The discriminating portion of the strobe waveform must be sufficient that for the operating range of the device it can discriminate, in combination with the appropriate data waveform, between the different stable states of the device. However actual latching can be aided by a pulse extending beyond the line addressing time of that particular row. The person skilled in the art would be well aware of the effects of strobe extension in this manner as is described in U.S. Pat. Nos. 5,963,186 and 5,823,344. The amount of extension chosen, if any, could depend on some operating parameter such as the temperature.

Extending the duration of the discriminating portion of the strobe waveform again requires dc balance to be achieved. Conveniently therefore the modulus of the dc voltage time product of the blanking portion is equal to the modulus of the dc voltage time product of dc balancing portion and the discriminating portion. It is possible for the blanking portion to extend into previous line addressing times and the discriminating portion to extend into following line address times and achieve dc balance without the need for a dc balancing portion. However, as mentioned, it is preferred to have a dc balancing portion immediately preceding the blanking portion.

Whenever an electric field is applied there is a degree of ac poling of the liquid crystal material due to its RMS response. Where the strobe waveform is a series of short pulses of opposite polarity this ac poling of the liquid crystal material occurs even though the pulses are of insufficient duration to cause significant dc poling effect from the ions. The material behaves as a normal nematic material and is aligned by the field according to its dielectric anisotropy. For materials with a positive dielectric anisotropy the effect will be that the liquid crystal material tends to align with the field. This alignment will reduce contrast of the device as the liquid crystal material in the bulk of the device may be held in an incorrect state by the RMS effect of the applied field. However the effect of the ac poling will also concentrate the elastic distortion of the liquid crystal closer to the surface of the cell wall and therefore increase the magnitude of the flexoelectric polarisation in the vicinity of the grating. As the latching between states is a result of the resultant of the discriminating pulse and data waveform polarity coupling with the flexoelectric effect the latching of the liquid crystal material into either state is hence increased by pre-stressing the liquid crystal material by a certain amount of ac bias.

Therefore the strobe waveform may be preceded by an ac component. It should noted here that even a dc field would cause poling effect as described as the nematic material would be responding to the quadripolar effect of the field, i.e. the response of the liquid crystal material proportional to E squared. Therefore the term ac component should be taken to mean any applied field which has such an effect. The ac component is preferably a series of relatively short pulses of opposite polarity however to achieve dc balance and also to reduce problems in losing discrimination in latching. Further there may be ionic breakdown problems associated with long periods of applied dc.

Also the discriminating portion may be followed by a final portion of opposite polarity to the discriminating portion. This can provide for additional dc balancing and can reduce pixel pattern effects. Also after the field is removed it can be advantageous to reduce ionic effects as soon as possible and a portion of opposite polarity aids in regaining ionic equilibrium faster.

In another aspect of the present invention there is provided a multistable nematic liquid crystal device comprising a layer of nematic liquid crystal material disposed between two cell walls, at least one cell wall having a surface treatment such that the liquid crystal material is latchable between at least two stable molecular configurations upon application of appropriate voltage pulses, row and column electrodes disposed on the cell walls to form an addressable matrix of pixels, and driving means for applying a strobe waveform to each row electrode in a sequence and one of at least two data waveforms, to each column electrode simultaneously wherein each data waveform has a duration equal to the line address time and has a zero net dc value and wherein the strobe waveform has a net zero dc value over a whole frame time and comprises a blanking portion, which in combination with any data waveform will cause the liquid crystal material to adopt a first particular state, immediately preceding a discriminating portion, which in combination with one data waveform will cause the liquid crystal material to remain in the first stable state and in combination with the another data waveform to latch to the another stable state, characterised in that the driving means is adapted such that only one strobe waveform is applied to each row when addressing a particular frame and in that during the line address time wherein the appropriate data waveform is applied to each column for the pixels of a particular row at least part of the blanking portion and at least part of the discriminating portion is applied to that row.

Preferably the device includes means for optically distinguishing between the at least two stable liquid crystal configurations.

Conveniently the surface treatment is such that there are two stable liquid crystal states.

Preferably the surface treatment is adapted such that latching from a first stable state to a second stable state requires less energy than latching from the second stable state to the first.

A range of different device drivers for supplying the voltage waveforms to the row and column electrodes could be used but in some instances it is preferred to use commercially available STN drivers, currently used to address STN liquid crystal devices. STN drivers are readily available, reliable and inexpensive and therefore are useful for low cost applications.

Therefore in another aspect of the invention therefore there is provided a method for addressing a bistable nematic liquid crystal device having a layer of nematic liquid crystal material disposed between two cell walls and row and column electrodes disposed on the cell walls to form an addressable matrix of pixels, the liquid crystal material being latchable between two stable molecular configurations upon application of appropriate voltage pulses and having at least one row driver for applying voltages to said row electrodes and at least one column driver for applying voltages to said columns, the method comprising the steps of;

each said row driver supplying an active row voltage waveform to each row electrode sequentially for a line address time whilst simultaneously supplying a non-active row voltage waveform to every other row electrode for the line address time each said column driver supplying one of two data voltage waveforms to each column electrode simultaneously during the line address time, wherein said row and data voltage waveforms are such that the resultant voltage waveform at each pixel on the active row has a blanking portion that causes the liquid material to be latched to one stable state and a discriminating portion that causes the liquid crystal material to be selectively latched or not to the other stable state depending on the data voltage waveform applied to that column and wherein said blanking portion immediately precedes said discriminating portion, and such that the liquid crystal material at each pixel on a non-active row is not latched from its current stable state, and wherein the resultant voltage waveform at each pixel is dc balanced over the line address time.

The method of this aspect of the invention can be implemented using STN drivers.

As will be explained in more detail later the STN drivers are arranged generally to output only a fixed number of voltage levels (four for the row driver and four for the column driver), all of the same polarity. As mentioned above voltage resultants of differing polarities are needed to achieve selective latching of the liquid crystal material at a pixel. A positive voltage resultant at a pixel can be achieved by having a positive voltage on the relevant row and no voltage on the relevant column. A negative voltage resultant is then achieved by having a positive voltage on the relevant column and no voltage on the row. Thus the method of this aspect of the invention uses voltage waveforms on the row and column electrodes which combine to form the required resultant—that is one having a blanking portion immediately preceding a discriminating portion.

It should be noted that when a high positive voltage is applied to a column, to achieve a negative resultant at a pixel being addressed, that voltage is also applied to all the other pixels on that column. To prevent unwanted switching of these pixels each non addressed row is addressed with a voltage waveform to reduce the voltage resultant. For instance a positive voltage applied to each non addressed row reduces the resultant at the non addressed rows.

Therefore this aspect of the present invention is akin to applying voltage reduction waveforms to the addressing schemes described above.

Using STN drivers requires the effective strobe signal to be wholly applied during the line address time for addressing the row. Also it is not possible to produce a zero voltage resultant at any time but with these exceptions the method of this aspect of the invention can be used to implement any of the resultant waveforms discussed with respect to the other aspects of the invention and in particular resultant waveforms may benefit from any of a dc poling portion prior to the blanking portion, an ac poling portion prior to the blanking portion and an ionic reduction portion after the discriminating portion.

Figure 2:
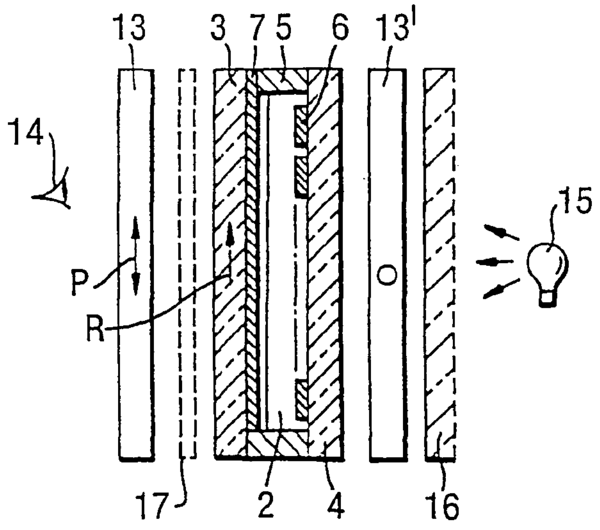
Figure 3A:
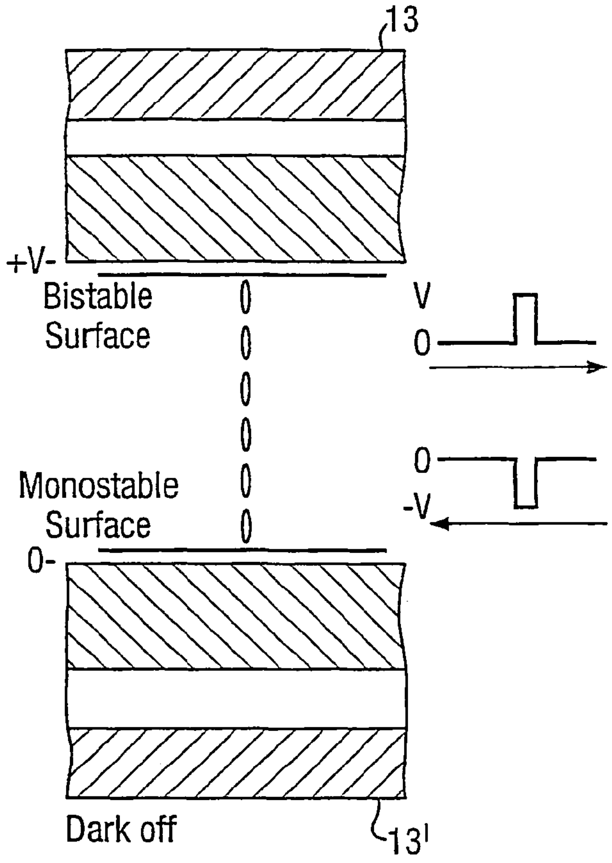
Figure 3B:
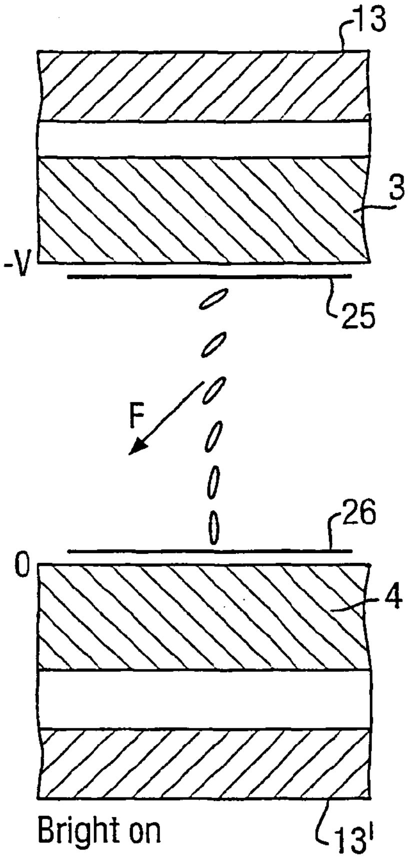
Figure 4:
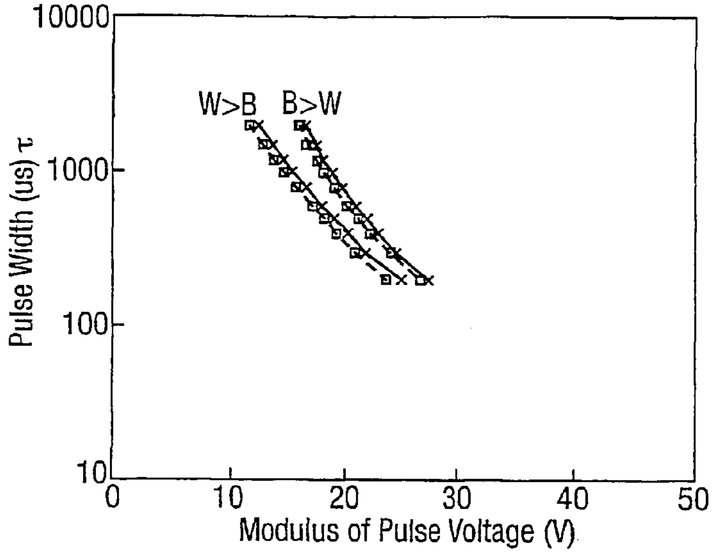
Figure 5:
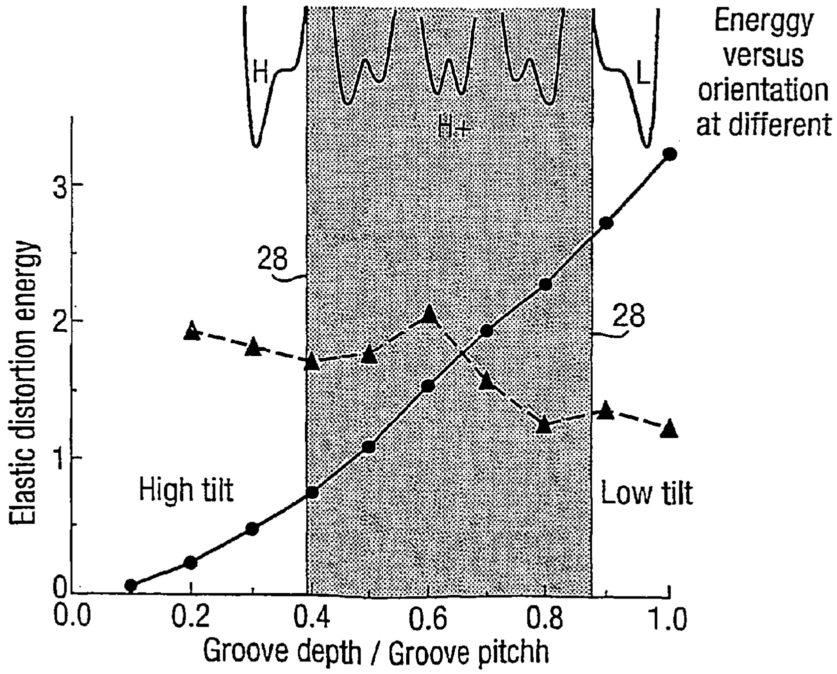
Figure 6:
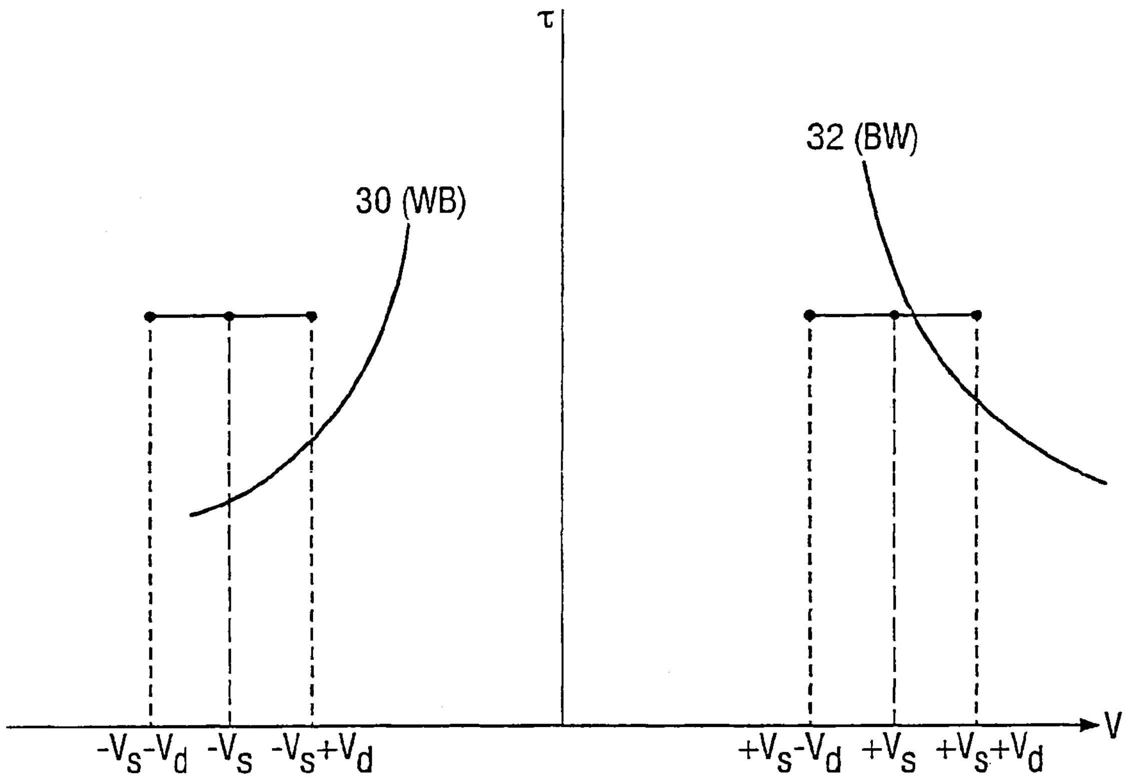
Figure 7:
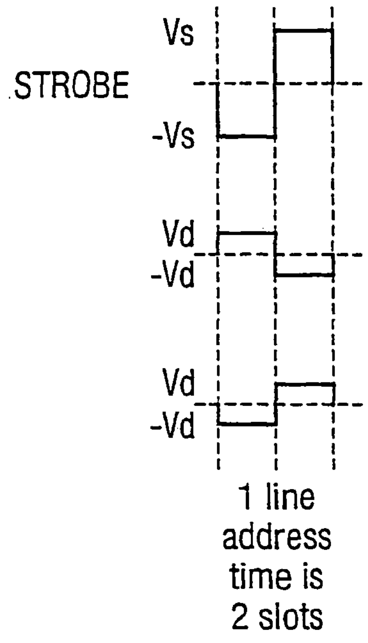
Figure 8:
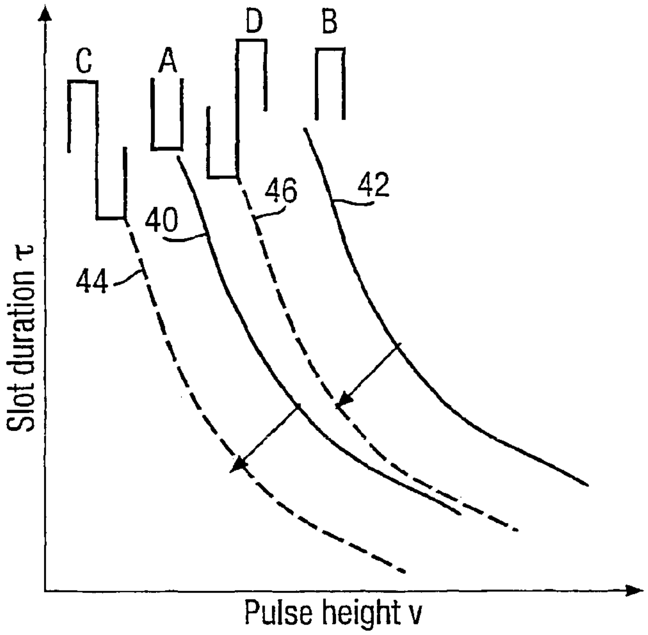
Figure 9:
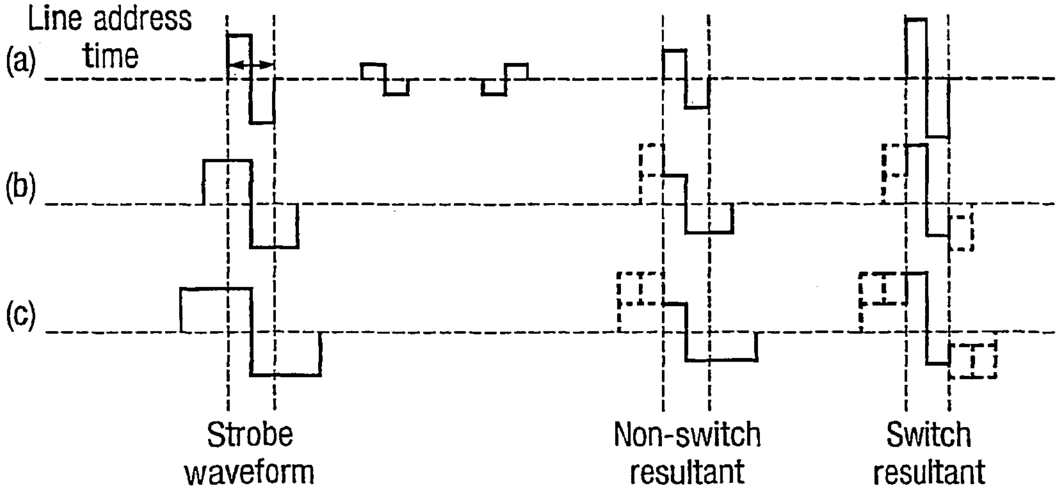
Figure 10A:
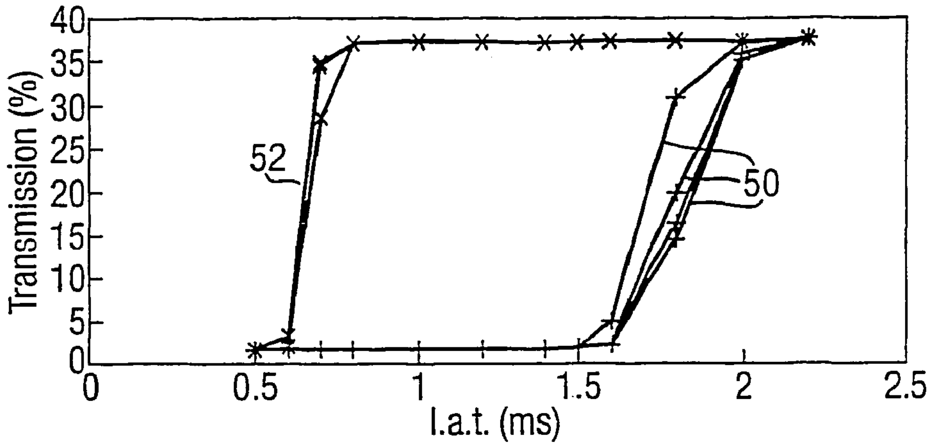
Figure 10B:
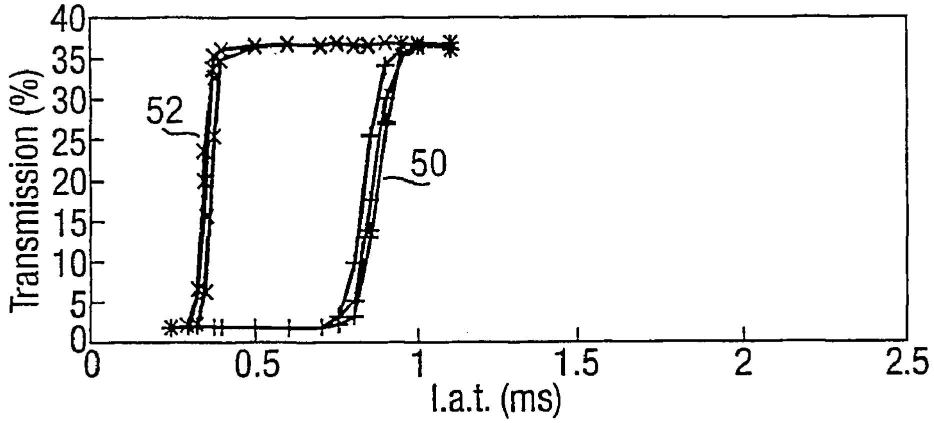
Figure 10C:
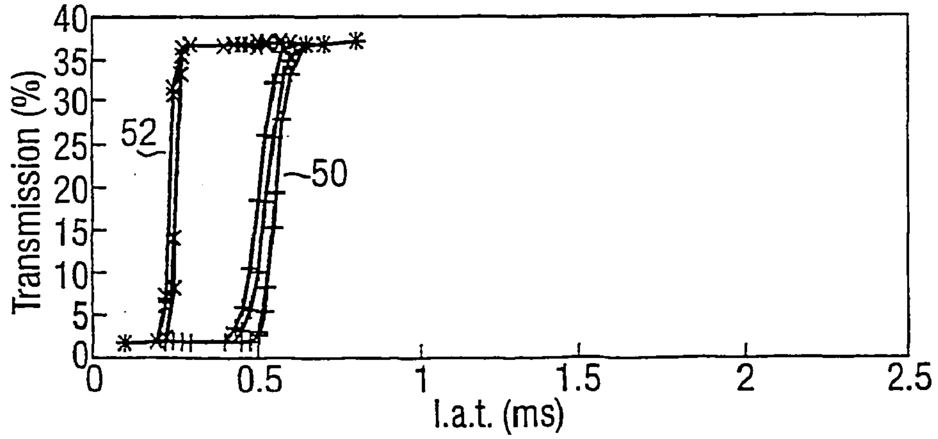
Figure 11:
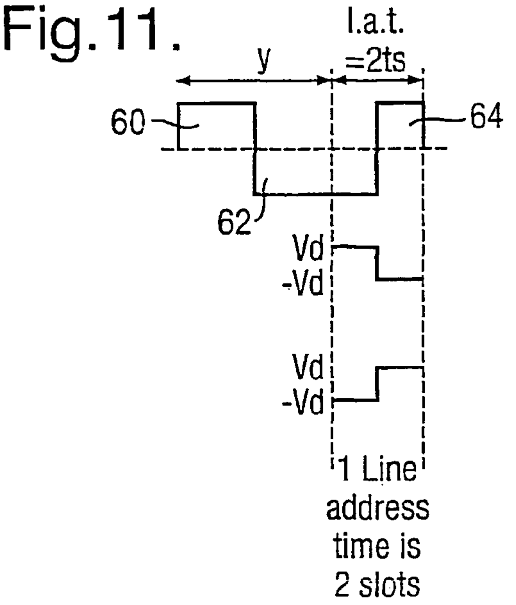
Figure 12:
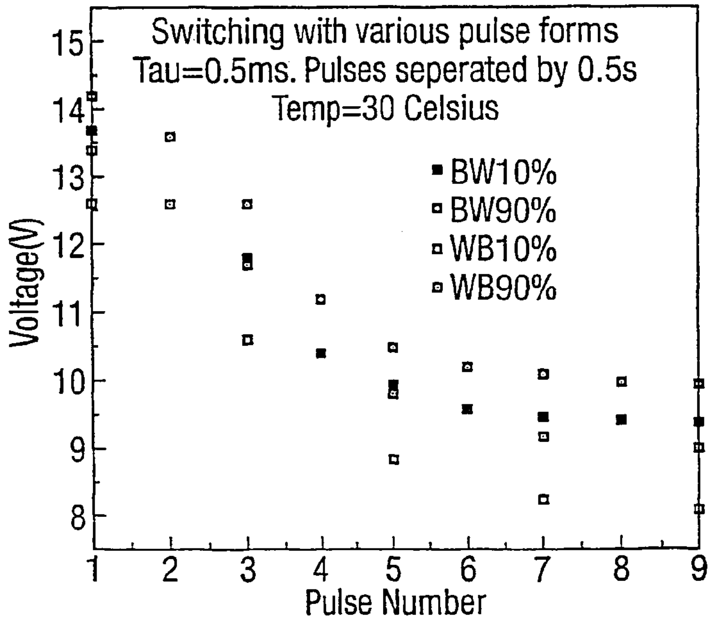

The invention will now be described by way of example only with reference to the accompanying drawings of which;

FIG. 1 shows a plan view of a matrix multiplexed liquid crystal display according to the present invention, FIG. 2 shows the cross section of the display of FIG. 1, FIGS. 3*a* and 3*b* show a cross section of a stylised cell configuration illustrating two stable states, FIG. 4 shows the latching threshold characteristic of a bistable nematic liquid crystal cell, FIG. 5 shows an energy diagram for the two stables states of a bistable device as a function of the ratio of groove height to pitch of the surface alignment grating, FIG. 6 shows a representation of latching curve such as shown in FIG. 4, FIG. 7 illustrates a latching scheme according to a first embodiment of the invention, FIG. 8 shows the effect of preceding a latching pulse with a pulse of opposite polarity on the latching characteristics, FIG. 9 illustrates a second embodiment of the present invention, FIG. 10 shows experimental results for the schemes shown in FIG. 9, FIG. 11 illustrates an embodiment of the invention wherein the strobe waveform is extended into the preceding rows, FIG. 12 shows the results of latching voltage against a varying amount of extension of the blanking portion of the strobe waveform.

Figure 13:
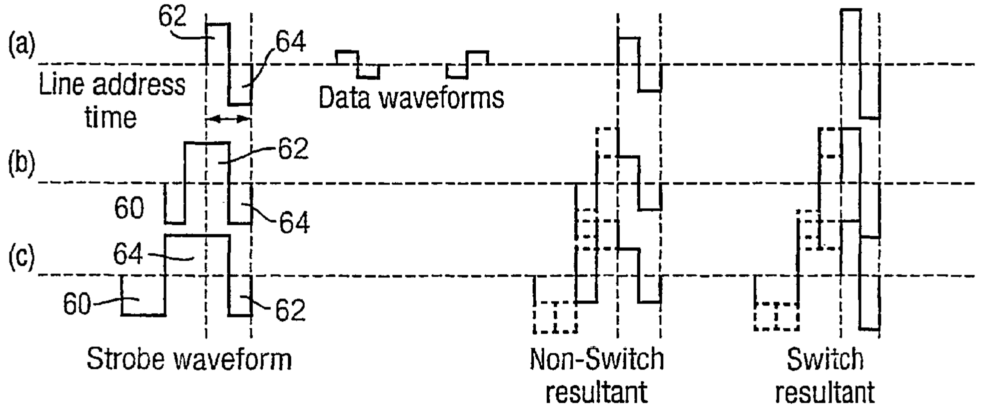
Figure 15:
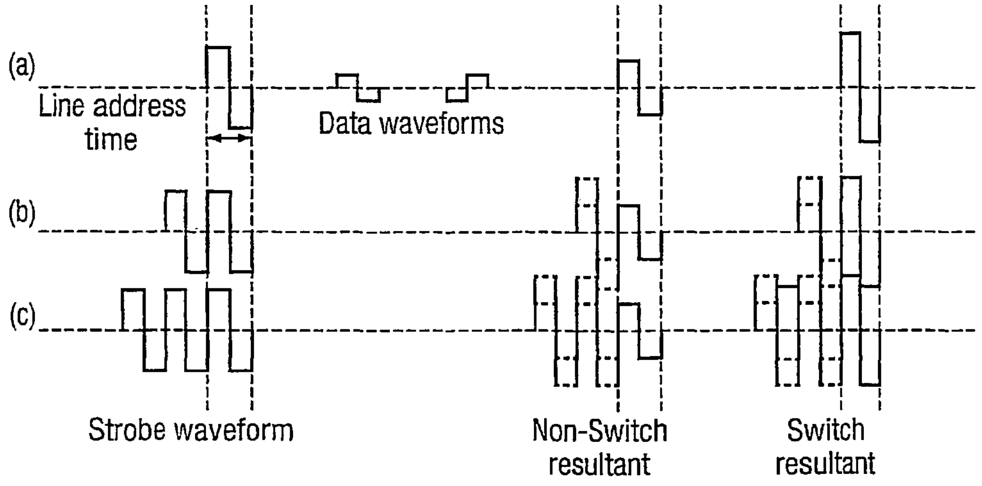
Figure 14A:
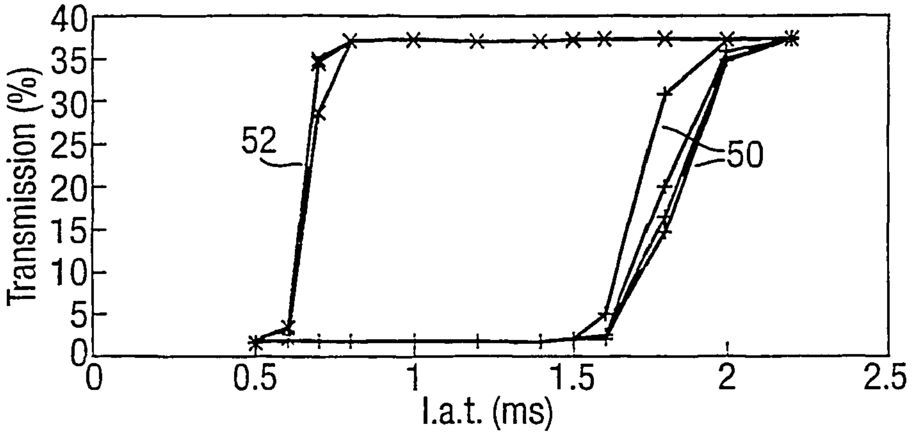
Figure 14B:
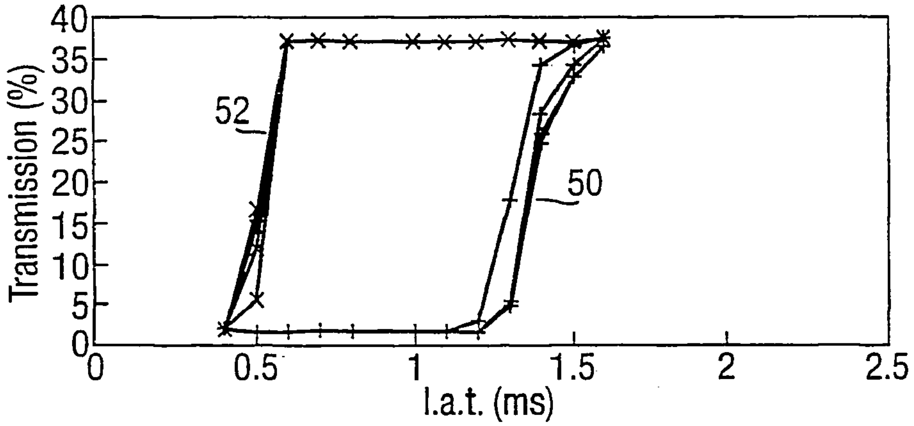
Figure 14C:
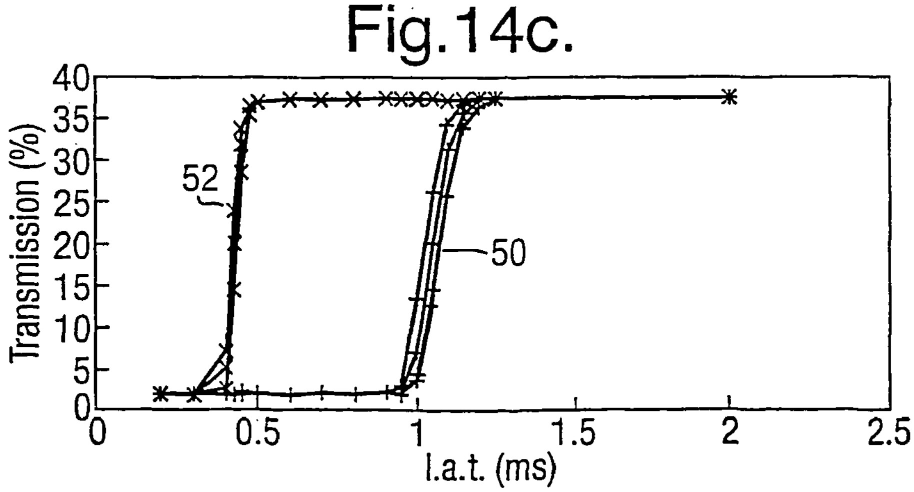
Figure 16A:
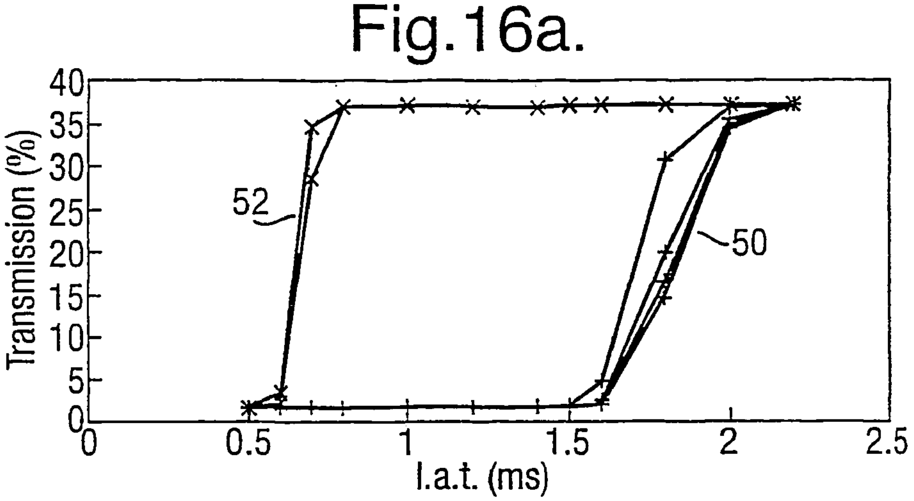
Figure 16B:
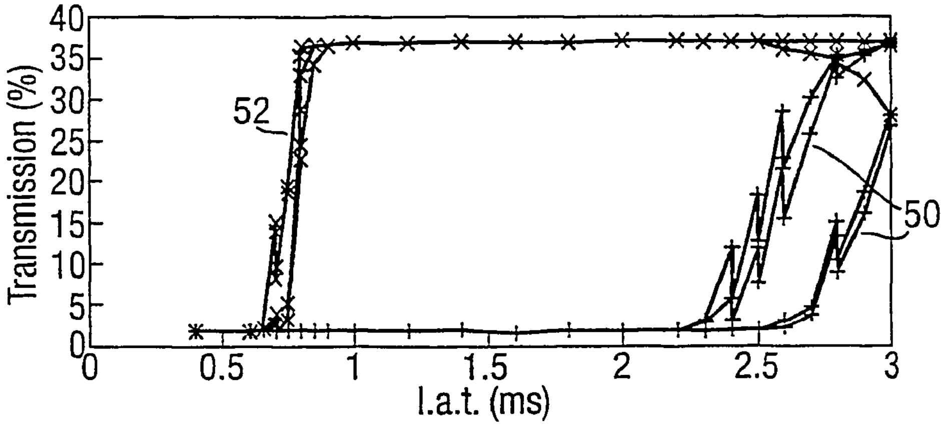
Figure 16C:
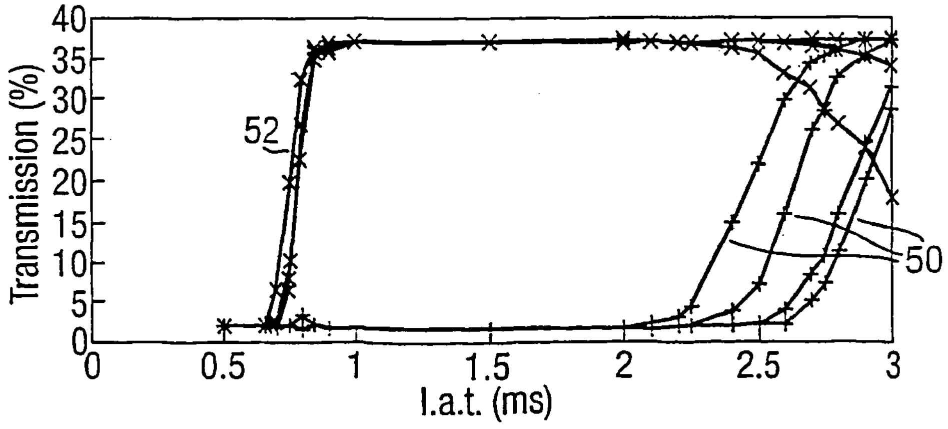
Figure 17:
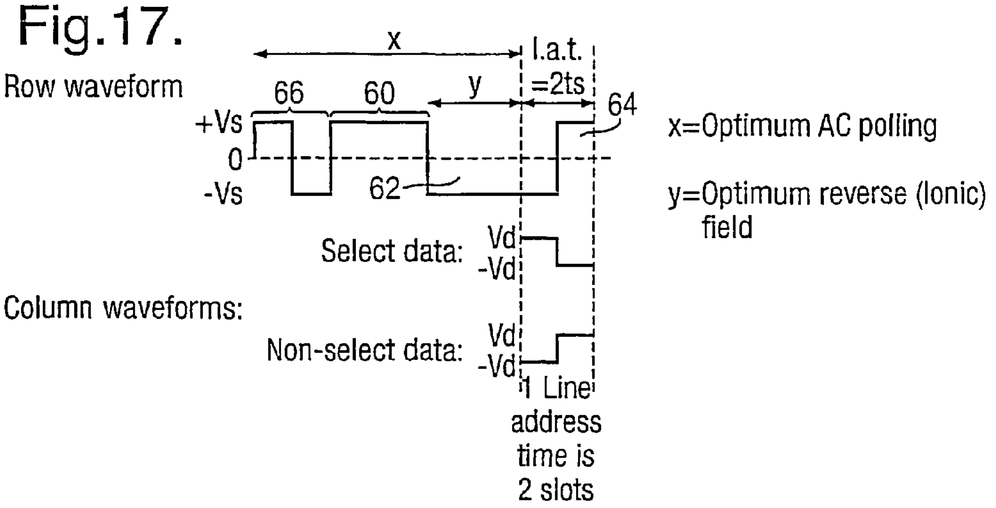
Figure 18:
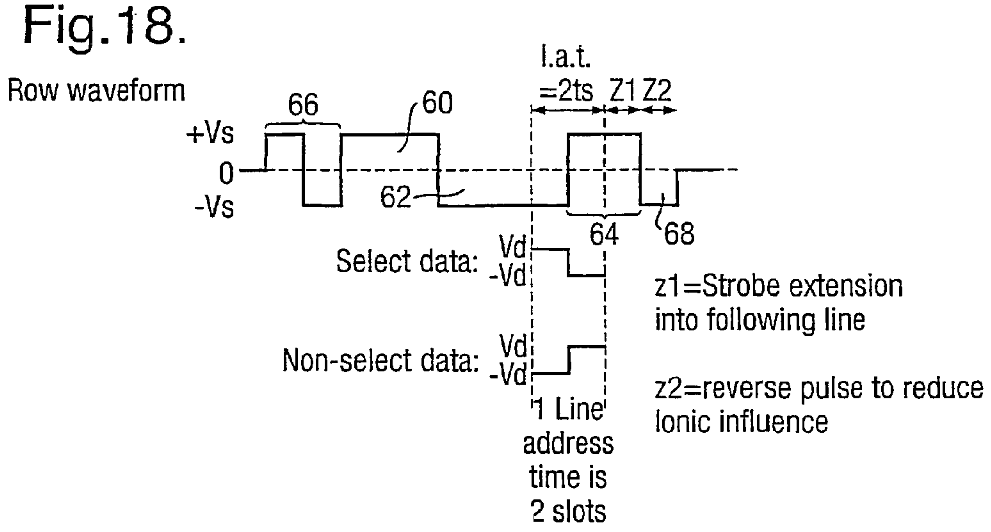
Figure 19:
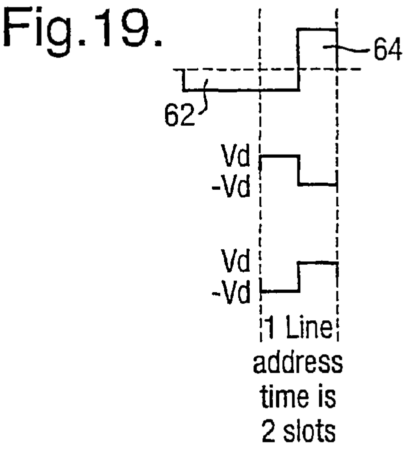
Figure 20:
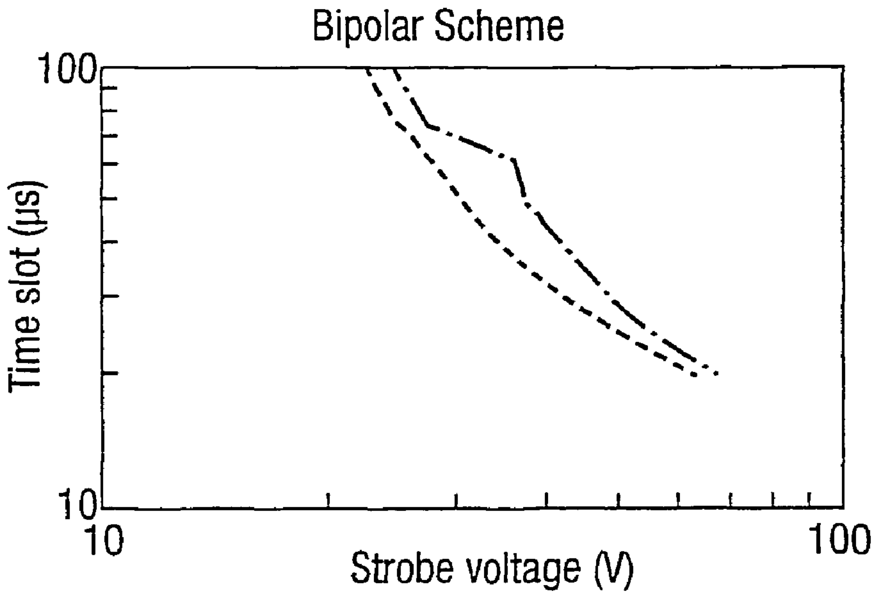
Figure 21:
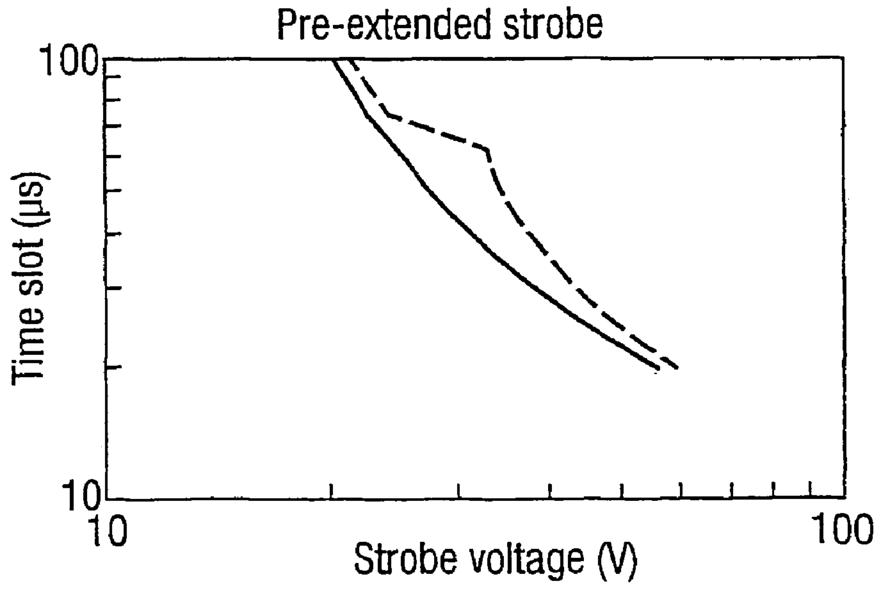
Figure 22:
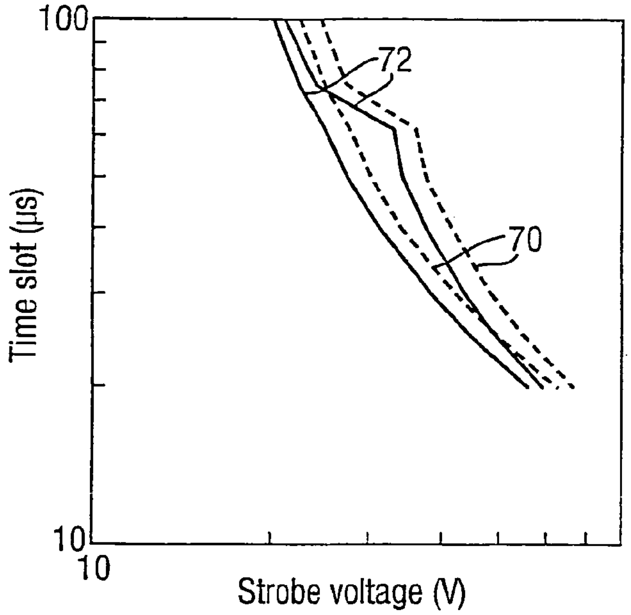
Figure 23:
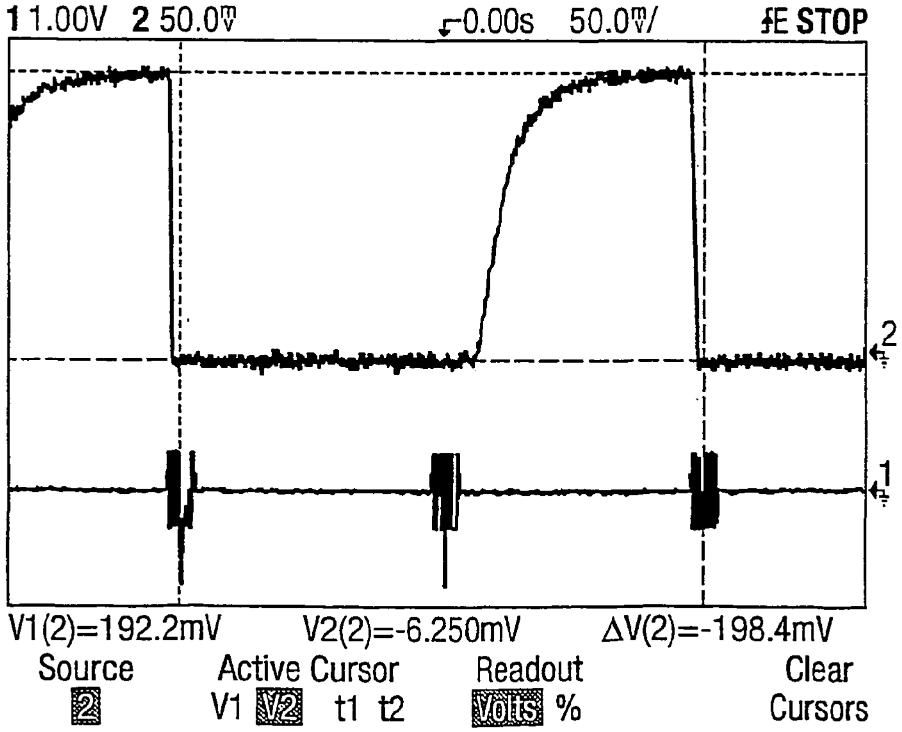
Figure 24A:
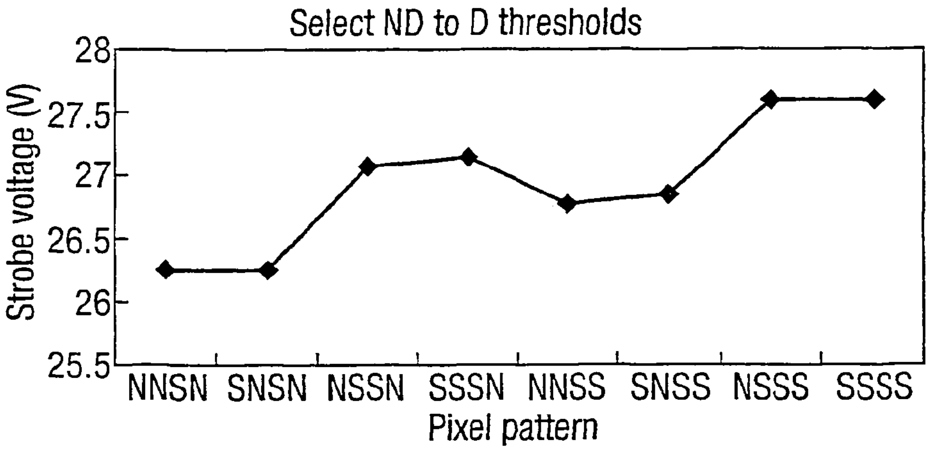
Figure 24B:
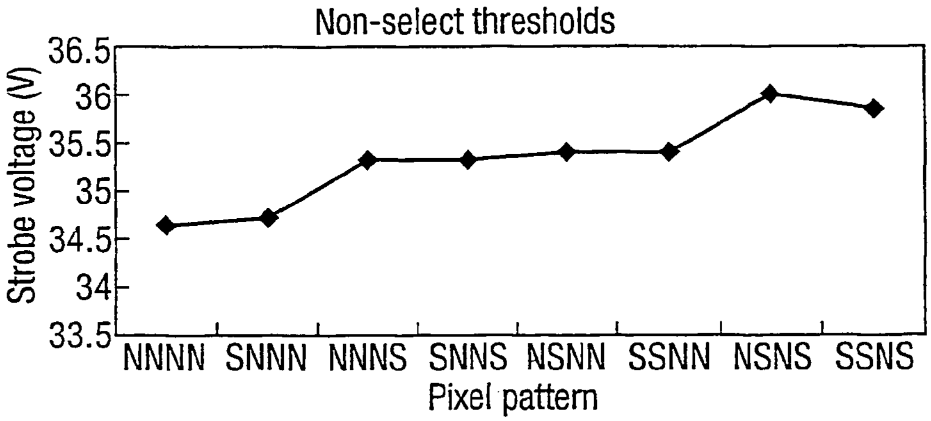
Figure 24C:
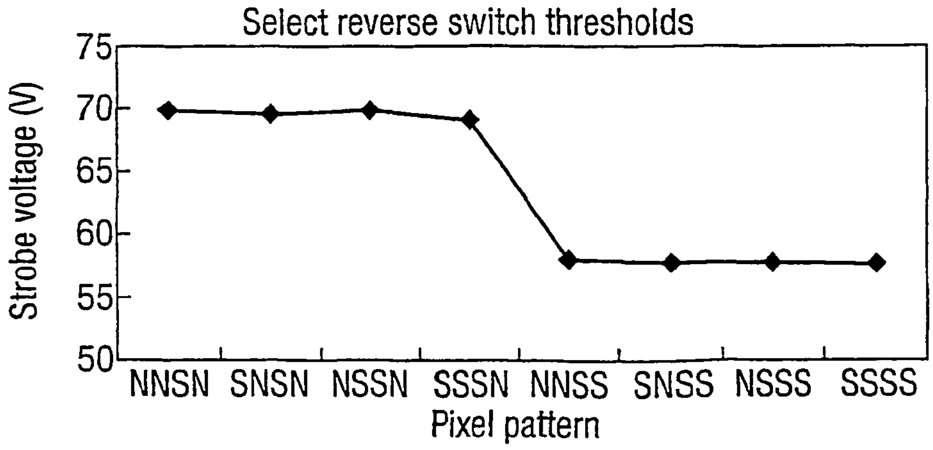
Figure 25:
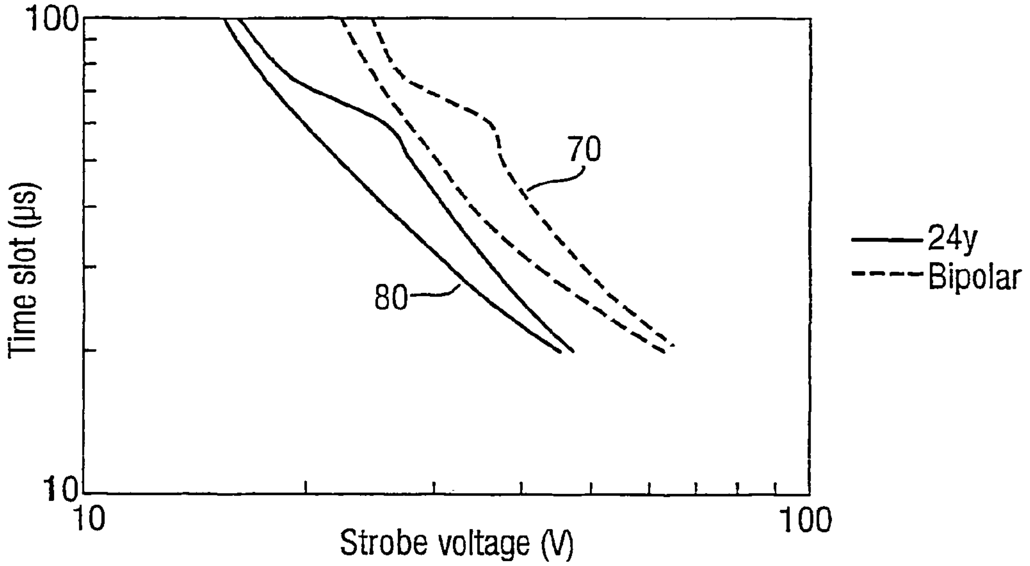
Figure 26:
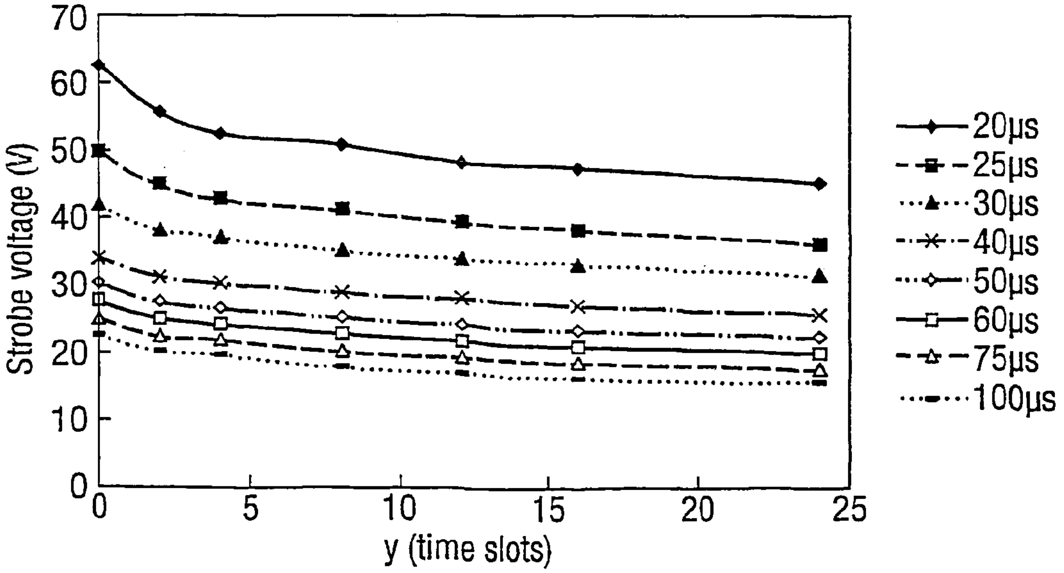
Figure 27:
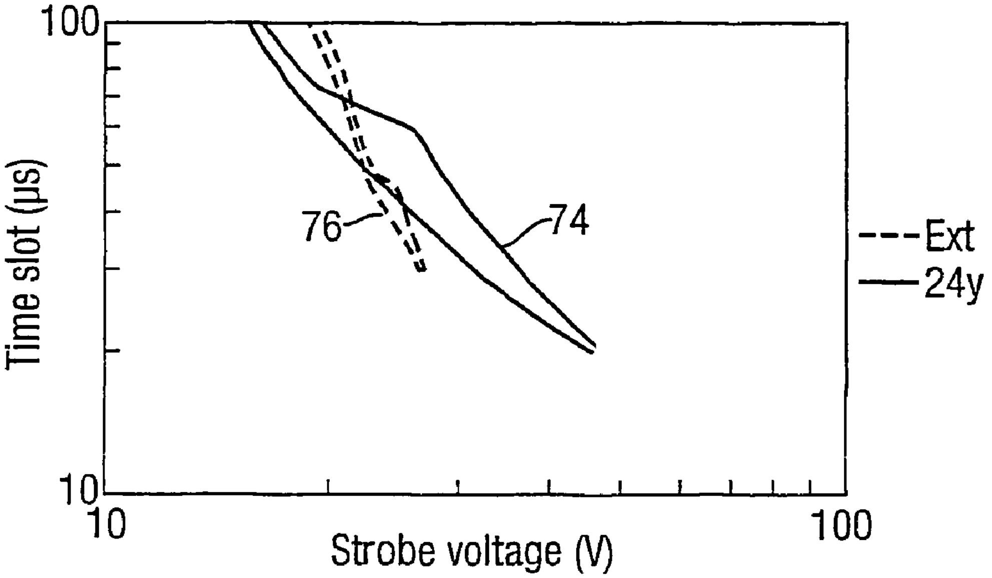
Figure 28:
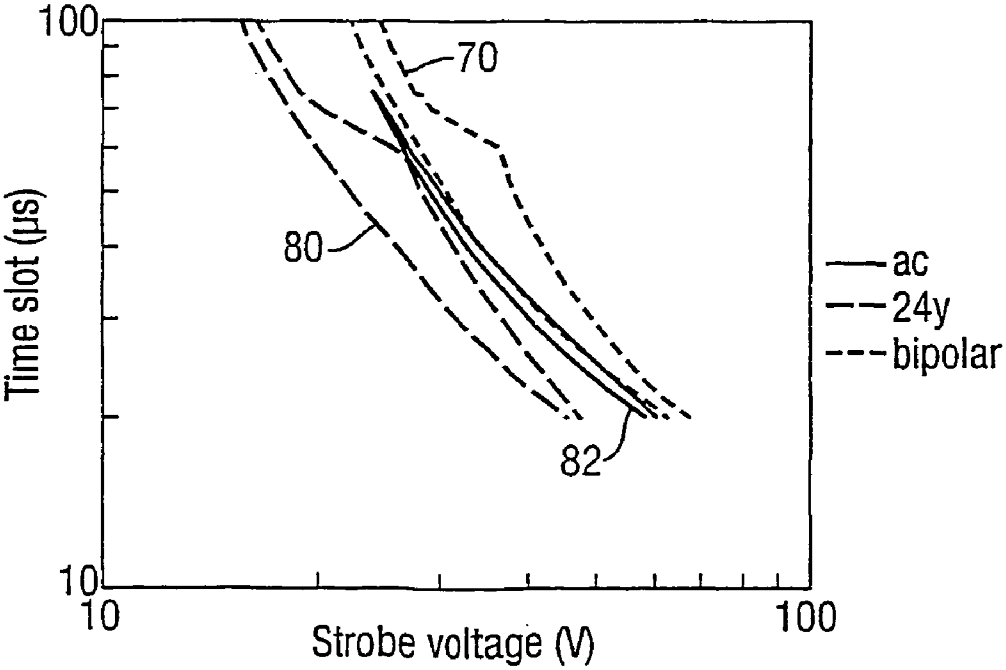
Figure 29:
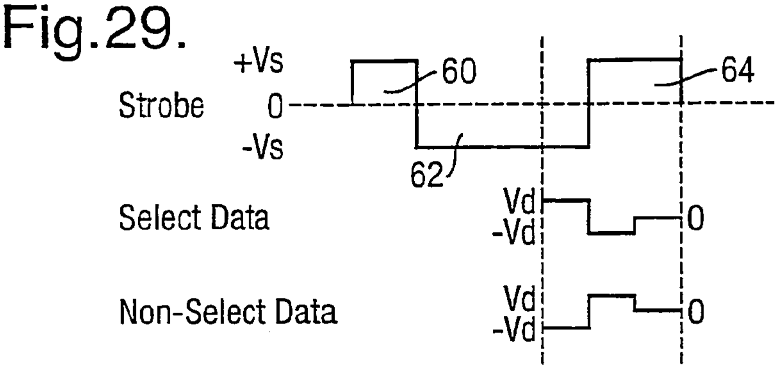
Figure 30A:
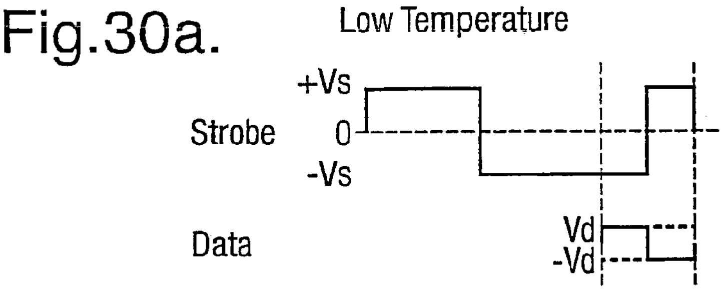
Figure 30B:
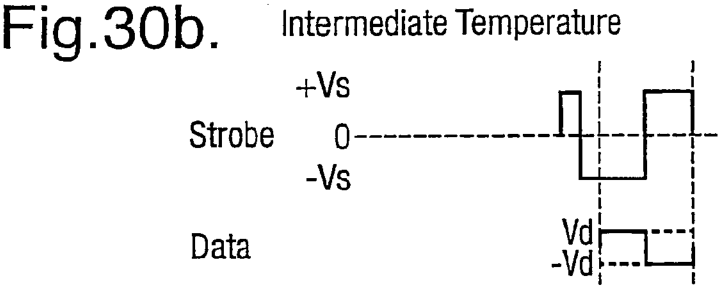
Figure 30C:
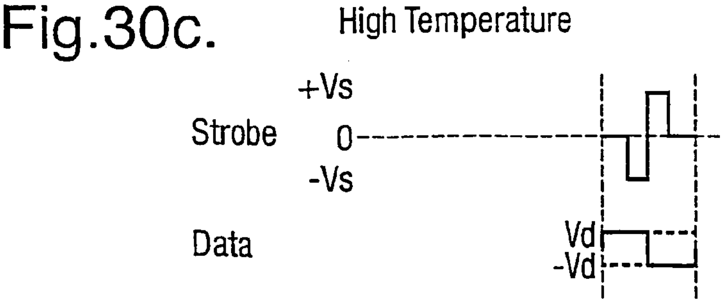
Figure 31:
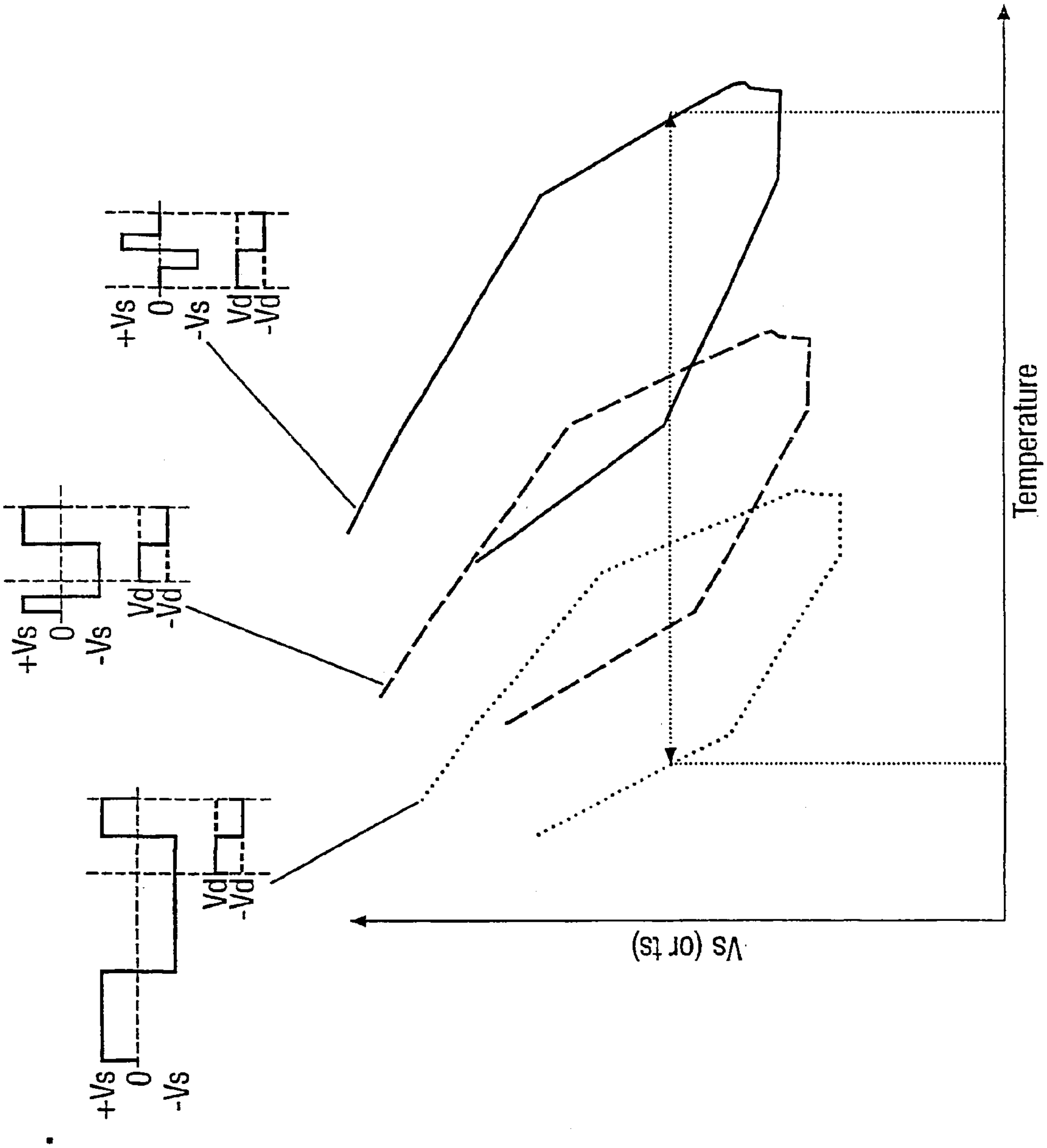
Figure 32:
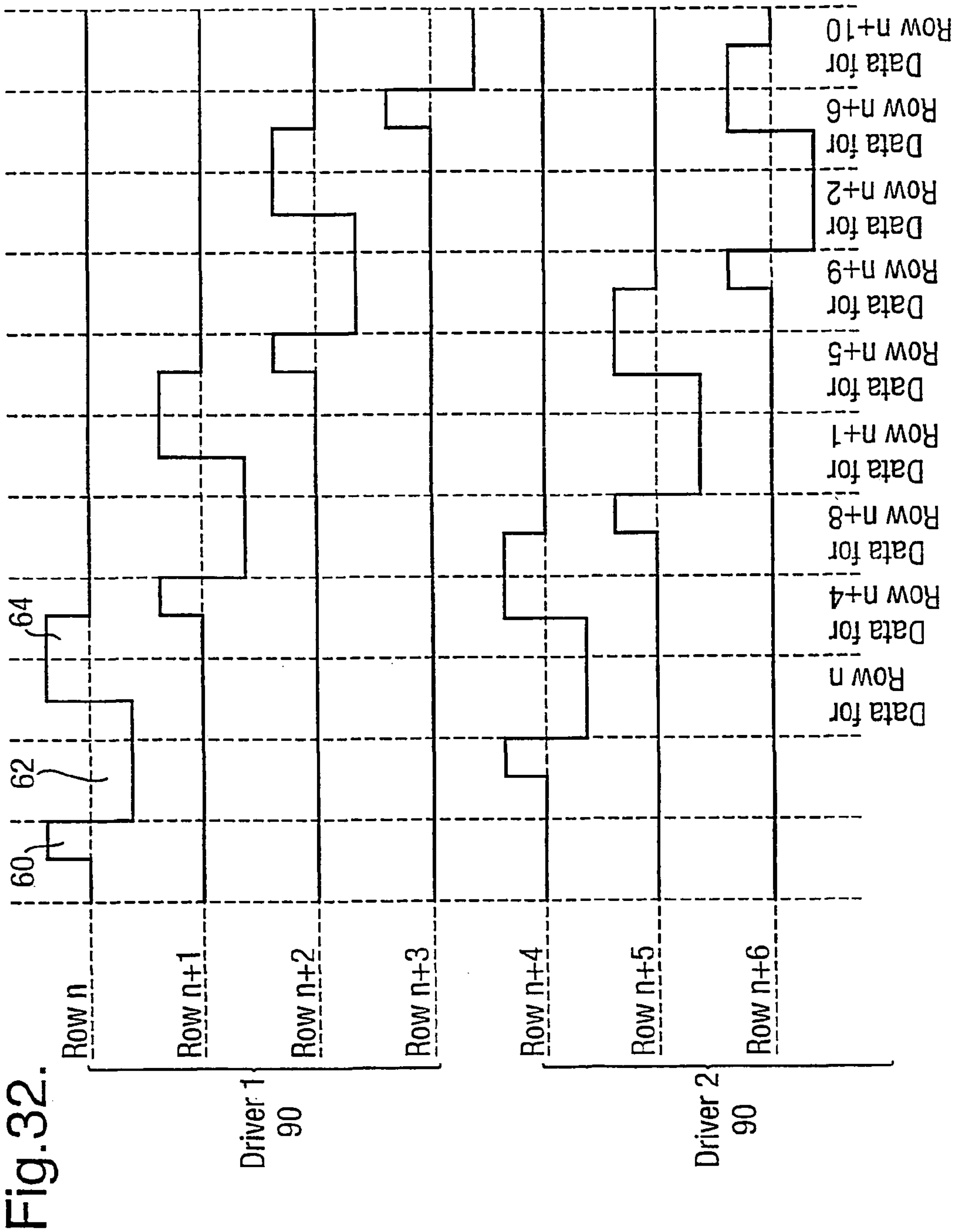
Figure 33:
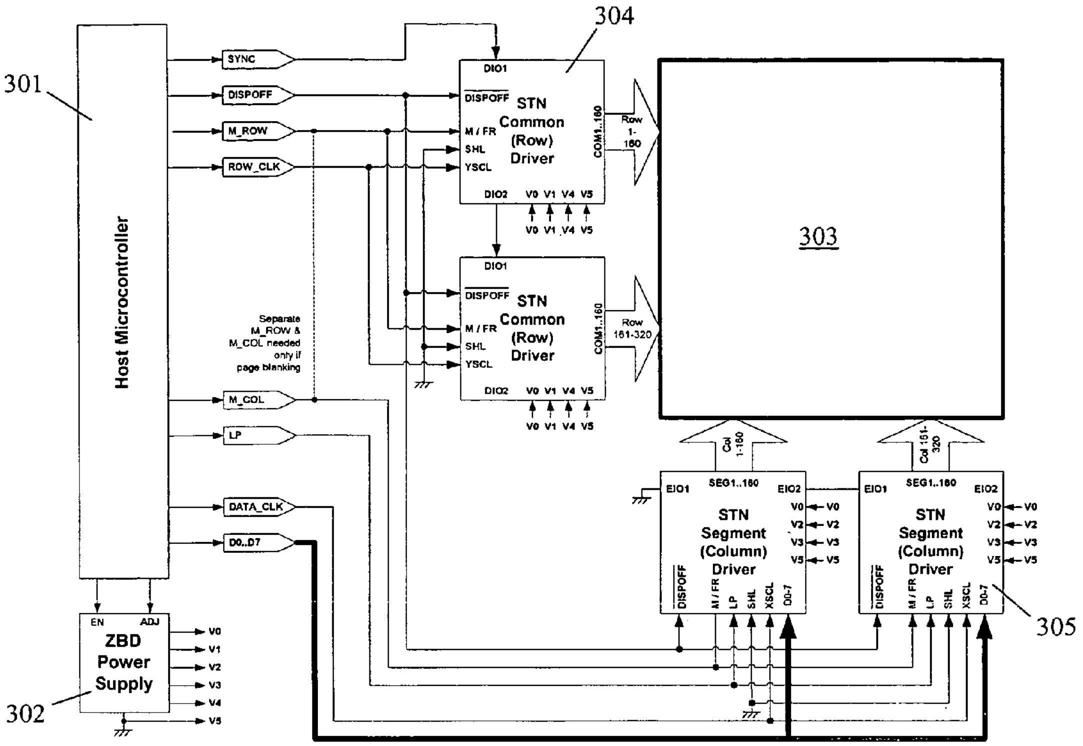
Figure 34:
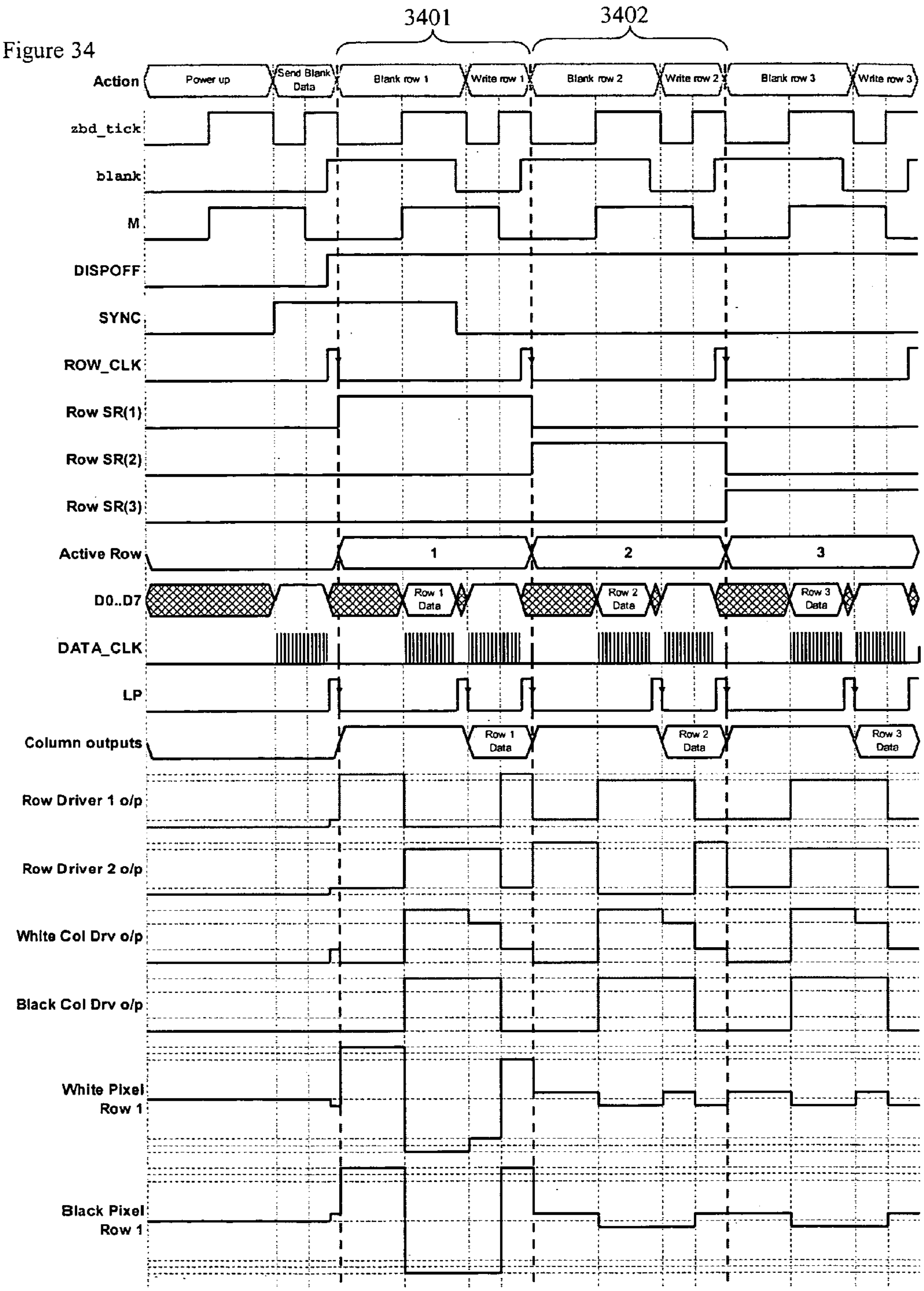
Figure 35:
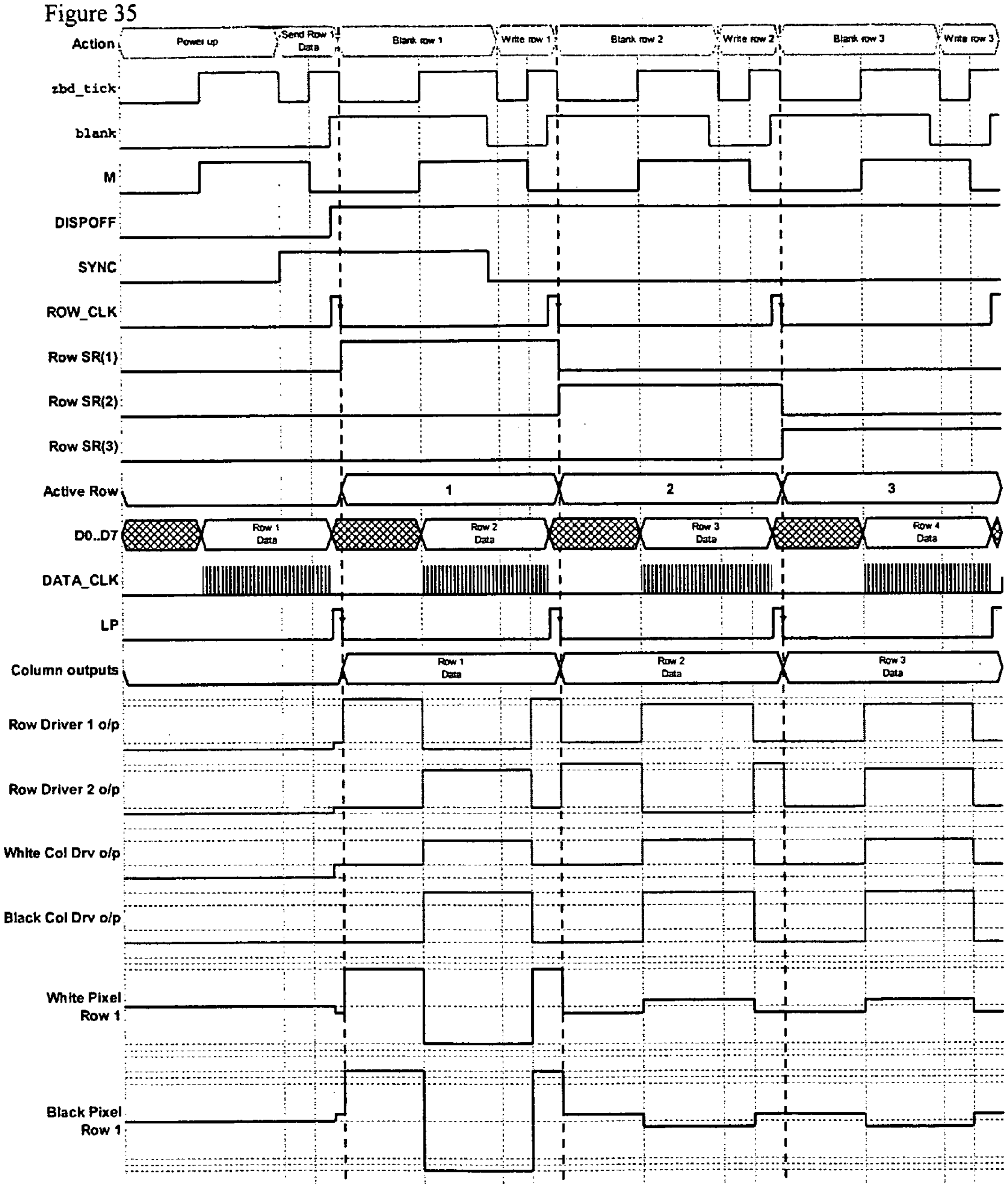

FIG. 13 shows an unextended strobe waveform and two strobe waveforms extended according to FIG. 11, FIG. 14 shows the experimental results for the waveforms shown in FIG. 13, FIG. 15 shows some strobe waveforms having an initial ac component, FIG. 16 shows the results of using the strobe waveforms illustrated in FIG. 15, FIG. 17 illustrates another waveform according to the present invention having an ac component, a dc balancing portion, a blanking portion and a discriminating portion, FIG. 18 illustrates another suitable strobe waveform similar to the one shown in FIG. 17 but including a final portion of opposite polarity to the discriminating portion, FIG. 19 shows a strobe waveform where the magnitude of the blanking portion if different to that of the discriminating portion, FIG. 20 shows the operating window for the bipolar strobe waveform of FIG. 13(*a*) in terms of voltage against time slot, FIG. 21 shows the operating window for the strobe waveform of FIG. 13(*b*), FIG. 22 shows a comparison of the operating windows shown in FIGS. 20 and 21, FIG. 23 shows a transmission versus time plot of a pixel being addressed with the strobe waveform of FIG. 13(*b*) and non-select, select and then non-select data waveforms, FIG. 24 shows the pixel pattern dependence of the latching threshold for the strobe waveform of FIG. 13(*b*) from a) black to white, b) white to black and c) reverse latching, FIG. 25 shows the operating windows for a bipolar strobe and a strobe pre-extended by 24 time slots, FIG. 26 shows the effect of pre-extension on voltage for a range of time slot values, FIG. 27 compares the operating windows of a pre-extended strobe with a strobe according to FIG. 9(*b*), FIG. 28 compares the operating windows of a bipolar strobe, a pre-extended strobe and a strobe with ac polling, FIG. 29 shows a waveform suitable for use with a three slot data waveform, FIG. 30 illustrates a range of strobe waveforms that could be used at different operating conditions, FIG. 31 illustrates the effect on operating window of the various waveforms shown in FIG. 30, FIG. 32 shows a scheme for multiplex addressing using a strobe waveform according to the present invention, FIG. 33 shows a typical connection diagram for STN type drivers used to display a bistable Nematic liquid crystal device, FIG. 34 shows a timing and voltage level diagram for an addressing scheme suitable for use with STN drivers, FIG. 35 shows a timing and voltage level diagram for another addressing scheme suitable for use with STN drivers, FIG. 36 shows a graph of temperature against time and illustrates how a look up table could be designed to change the line address time, voltage levels and/or addressing scheme used to compensate for temperature variations, and FIG. 37 shows the truth tables for STN driver outputs.

FIGS. 1 and 2 show a display such as described in WO97/14990. A liquid crystal cell 1 is formed by a layer 2 of nematic or long pitch cholesteric liquid crystal material contained between walls 3, 4, which may be any suitable material for instance glass and/or plastic. Silicon or metal could also be used if the device were to be operated in reflective mode. Spacers 5 distributed appropriately throughout the cell maintain the walls typically 1-6 μm apart. Strip like row electrodes 6, which may be, for example $SnO_2$, indium tin oxide (ITO) or Aluminium, are formed on one wall 3 and similar column electrodes 7 are formed on the other wall 4. With m-row and n-column electrodes this forms an m×n matrix of addressable elements or pixels formed by the intersection of a row and a column electrode.

A row driver 8 supplies voltage to each row electrode 6. Similarly a column driver 9 supplies voltage to each column electrode 7. Control of applied voltages is carried out by control logic 10 connected to voltage source 11 and clock 12.

Either side of the cell are polarisers 13, 13' arranged with their polarisation axis substantially crossed with respect to one another and at an angle of substantially 45° to the alignment direction R, if any, on the adjacent wall 3, 4. Additionally one or more optical compensation layers 17 of, for example, stretched polymer may be added adjacent the liquid crystal layer 2 between cell wall and polariser. Of course, the skilled person will be aware of other embodiments that could be implemented using one polariser or no polarisers at all.

A partly reflecting mirror 16 may be arranged behind the cell 1 together with a light source 15. These allow the display to be seen in reflection and lit from behind in dull ambient lighting. For a transmissive device the mirror 16 may be omitted. Alternatively an internal reflecting surface may be used such as an internal Aluminium electrode.

Prior to assembly at least one of the cell walls 3, 4 are provided with a surface alignment grating to provide a bistable pretilt. The other surface may be provided with either a planar, tilted or homeotropic monostable surface or another bistable surface.

The surface alignment grating structures providing bistable pretilt may be manufactured using a variety of techniques as described in WO97/14990.

The cell is filled with any suitable nematic material for example E7, ZLI2293, TX2A (Merck), ZLI4788, ZLI4415 or MLC6608 (Merck).

Small amounts, for example 1-5%, of a dichroic dye may be incorporated into the liquid crystal material. This cell may be used with or without a polariser to provide colour, improve contrast, and brightness if the dye is fluorescent, or to operate as a guest host type device. The polariser(s) of the device may be rotated to optimise contrast between the two latched states of the device.

Figure 3B:
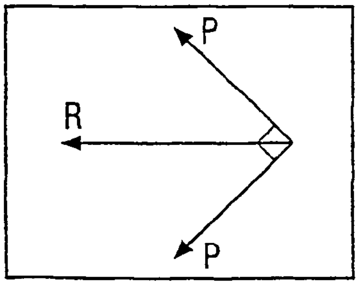

One suitable cell configuration to allow latching between the stable states is shown in FIG. 3 which shows a stylised representation of a cell which has a layer 2 of nematic liquid crystal material with positive dielectric anisotropy contained between a bistable grating surface 25 and a monostable homeotropic surface 26. The surface 26 could be, for example, a flat photoresist surface coated with lecithin. In this device the liquid crystal molecules can exist in two stable states. In the continuous state (a) the bulk of the cell is uniformly homeotropic and the liquid crystal director distorts continuously in the vicinity of the bistable surface. In the defect state (b) defects occur close to the bistable grating and the director is pretilted at an angle which is uniform with respect to the surface plane at some distance from the grating surface. Either state could be light or dark depending upon the orientation of the polarisers, bulk twist angle and cell geometry.

The near surface distortion in both states leads to a macroscopic flexoelectric polarisation, represented schematically by the vector F. A dc pulse can couple to this polarisation and, depending upon its polarity, will either favour or disfavour one of the states.

The latching characteristics of a bistable nematic liquid crystal cell of this type is shown in FIG. 4. The cell, BN820 was formed of liquid crystal material MLC6204 at a spacing of 4.5 μm had an almost symmetric grating structure treated to induce homeotropic alignment. The other surface had a rubbing direction parallel to the grating grooves. The latching characteristic was measured with a bipolar latching pulse preceded by a bipolar blanking pulse some time earlier. The blanking pulse was 20V applied for 1 ms with an interval of 500 ms to application of the next latching pulse. The results show the pulse width τ against the voltage of the pulse, V. It can be seen that there is an asymmetry in the latching response in that it is easier to latch from one state to the other (in this case from white to black) than vice versa (black to white).

It is noted that the arrangements described above with respect to FIG. 3 is only one of many possible arrangements. In other arrangements the surface opposite the alignment grating surface is a monostable planar surface, such as a rubbed polyimide, in which the preferred alignment direction of the monostable surface is twisted at an angle to the low tilt state of the bistable surface. This configuration gives excellent optical properties. It will be apparent to the skilled person that the invention can be applied to this and other configurations.

The actual energy to latch from one state to the other can be controlled by varying the shape of the surface alignment grating structure. FIG. 5 shows the elastic distortion energy of the two states as a function of the ratio of groove height to groove pitch for the alignment grating. Assuming the high tilt state is dark then the electrical energy required to latch the cell in this state is lower than for latching into the low tilt, defect state for shallow, rounded gratings. Alternatively the low tilt requires low latching energy for deeper, sharper gratings. In the region between the boundary lines 28 the device is bistable. Changing the liquid crystal material, altering the temperature of the grating surface properties all effect the anchoring energies and latching characteristic. Therefore suitable design can yield wider ranges.

In some embodiments the latching response could be symmetrical however an asymmetric response can give improved performance.

The asymmetry in this response allows for a pulse of a particular duration and voltage to always cause latching to one state but in combination with an appropriate other pulse allow selective latching into the other state.

This is illustrated with respect to FIG. 6 which shows a representation of a latching curve such as shown in FIG. 4. The τV product for latching from white to black, shown by curve 30, is lower than the τV product required to latch from black to white, as represented by curve 32. Latching to either state occurs when the resultant τV product is above the curve 30 or 32.

A strobe voltage $V_s$ may be applied for a duration τ such that the product is above the white-black latching curve 30 but below the black-white latching curve 32. This strobe pulse is combined with a data pulse however of a voltage $V_d$. It is well known that the resultant voltage, $V_r$, across the cell at a particular pixel is equivalent to the voltage applied to the row minus the voltage applied to the column, in this case equal to $V_s - V_d$.

Of course both the strobe and data pulses may be positive or negative. Thus there are four possible resultants $\pm V_s \pm V_d$. It should also be remembered that the white-black transition only occurs at a different polarity to the black-white transition as shown.

The resultant voltages of the effective pulse can be seen on FIG. 6. It can be seen that both $-V_s+V_d$ and $-V_s-V_d$ are above the latching curve 30 for the white-black transition and hence either of these two resultant would latch the liquid crystal material into the black state. However whilst $+V_s+V_d$ is above the black-white latching curve 32, $+V_s-V_d$ is not. Thus discrimination between the black and white states could be achieved by selectively applying the appropriate data pulse.

A first embodiment of the invention is therefore shown in FIG. 7. Here the addressing scheme is a bi-polar self blanking scheme. The strobe pulse is a negative voltage $-V_s$ for a first time slot then a positive voltage $V_s$ for a second time slot. The date waveforms are again bi-polar pulses having a first time slot of a pulse of a voltage $\pm V_d$ and a second time slot of a pulse of equal and opposite magnitude.

The first pulse of the strobe waveform is a blanking portion and will cause the liquid crystal material to latch into the black state (or white state depending upon the design) whatever data waveform is applied. It also ensures dc balancing of the strove waveform on each row.

The blanking first pulse can also cause the liquid crystal to change to a non stable configuration during the blanking portion due to the rms effect. This in effect pre-stresses the liquid crystal material at that pixel by coupling to the dielectric anisotropy. This concentrates the elastic distortion of the liquid crystal material closer to the grating surface which results in an increase of the magnitude of the flexo-electric polarisation. This can enable the liquid crystal to be latched to a stable state with less electrical energy, i.e. at a lower τV. Preferably the liquid crystal material has a positive dielectric anisotropy such that the material couples with the applied field. However in alternative arrangements materials with a negative dielectric anisotropy would be preferred.

Further the applied field of the first blanking pulse induces an ionic drift in the ions present in the liquid crystal material across the cell at that pixel. Positive ions will be drawn to a negative cell wall and negative ions to a positive cell wall. Build up of the ions at the cell walls will slowly start to reduce the effective field across the cell. The effect of the applied field causes the ionic species to move which could be seen as building up a reverse field themselves. When the polarity of the applied field is reversed the ions start to migrate in the other direction and thus the ionic effect reduces. However the ions move relatively slowly and thus take some time to migrate. Immediately after the field is reversed the effect of the accumulated ions will be relatively large and will slowly decay. However in the present invention the polarity reversal happens during the line address time synchronously as the appropriate data waveform is applied. Thus the build of ions due to the blanking pulse will increase the overall voltage of the resultant during the line address time where the appropriate data waveform is applied and thus the line address time and/or voltage may be reduced. This effect is related to the resistivity of the liquid crystal material. If the resistivity is too high (eg above $10^{11}$ Ωcm), the ionic poling effect is small, and the advantage of the pre-extended waveform is diminished. However, if the resistivity is low (eg below $10^8$ Ωcm at 25° C.) the operating window is reduced by the ion induced reverse switching. The material chosen for the present study has a measured resistivity of $5\times10^9$ Ωcm.

FIG. 8 shows the effects of having a pulse of opposite polarity on the latching characteristics of a bistable nematic liquid crystal device. Curves 40 and 42 shows the latching characteristic of a device when a unipolar pulse of opposite polarities are used, curve 40 representing, say, the white to black transition and curve 42 the black to white. When these pulses are preceded by a pulse of opposite polarity however the latching curves obtained are shown by curves 44 and 46 where the voltage and/or pulse duration required to latch have been reduced.

The discriminating portion of the strobe pulse may also be extended beyond the line address time as is known to increase speed of operation. However the blanking potion may also be extended into previous lines to aid the latching response. FIG. 9 illustrates a second embodiment of the present invention wherein the strobe pulse is extended into both the preceding and following lines. FIG. 9*a* illustrates the two slot strobe described previously, except that the strobe is positive for the first time slot and negative for the second, along with the two data waveforms.

FIG. 9*b* illustrates a strobe which is four time slots long. The blanking portion is positive for two time slots and then the discriminating portion is negative for two time slots. This scheme is dc balanced. FIG. 9*c* shows a scheme where both the blanking portion and discriminating portion last for three time slots.

For all these schemes latching again occurs with the discriminating portion and blanking occurs for the first part. For some applications blanking to the black state is preferred. However in some applications it will be preferred to blank to the white state.

The resultant waveforms are shown on the right hand side. Where the strobe is extended beyond the line address time the resultant may have different forms depending on the pixel pattern, i.e. the data being applied to the preceding and following rows. The dotted lines represent the possibilities.

Extending the discriminating part of the strobe waveform allows latching between states to occur at a lower voltage or in a shorter period. The device however must not latch into the wrong state due to later waveforms being applied. The operating window is defined by the worst case scenario as would be well understood by a person skilled in the art, that is the data waveform or pixel pattern that lead to the highest τV for the select, i.e. latch, resultant and the lowest τV for the non-select resultant.

Extending the blanking portion of the strobe waveform into preceding lines similarly ensures a wide blanking window of operating conditions. However the extended pulse of opposite polarity to the discriminating pulse also has the ionic polling effect mentioned above as well as increasing the amount of pre-stressing thus increasing latching speed. Also it ensures that the strobe waveform is dc balanced. Extending the blanking portion before the line address time gives greater time for the relatively slow moving ions to migrate.

This effect of increasing the latching response by use of a pulse of opposite polarity to a discriminating portion can be used in standard addressing schemes. A scheme using a separate blanking waveform earlier in the frame time can still benefit from having a strobe waveform having a pulse of opposite polarity immediately precede the discriminating portion, the pulse of opposite polarity extending before the line address time. This is somewhat contrary to what might be expected.

Experimental results for the schemes shown in FIG. 9 are shown in FIG. 10. Using the schemes shown in FIG. 9 a non latch resultant was applied to the cell at different line address times with a variety of pixel patterns for the other rows to obtain curves 50 and the same with a latch resultant to produce curves 52. The cell used was the same again BN820 at 25° C. with a strobe voltage of 22.5V and a data voltage of 2V. FIGS. 11*a* to *c* show the results for the addressing schemes of FIGS. 10*a* to *c* respectively.

It can be seen that the greater the degree of extension the faster the possible latching line address time is. However the operating window is reduced.

Partly this will be due to the fact that extending the whole discriminating portion of the strobe means that the difference between a latching resultant waveform and non latching resultant waveform is less in relative terms. In other words the ratio of the data voltage to the entire discriminating portion of the strobe is being reduced by extension of the discriminating portion. Thus whilst extending the discriminating portion of the strobe would be expected to reduce the required line address time or reduce the voltage required there will also be less discrimination.

Further the first part of the pulse, the blanking pulse is a unipolar pulse and is not preceded by a pulse of the opposite polarity. Referring back to FIG. 8 curve 40 shows the latching characteristic of the blanking pulse (which in this case had a different polarity) which is not preceded by a pulse of the opposite polarity.

The discriminating portion of the strobe waveform however has a prepulse of the opposite polarity and therefore is represented by curve 46. The effect therefore is that the fastest latching speed would be expected to be increased but that also the two curves have been moved closer together and hence the operating window has been reduced.

In another embodiment of the present invention therefore the strobe is extended into the preceding lines in an asymmetric fashion, i.e. there is more pre-extension than post extension relative to the part of the strobe waveform corresponding to the line address time. This not only moves the latching curve of the blanking portion but also maximises the effect of pre-stressing and ionic poling of the liquid crystal material. A suitable scheme is shown is FIG. 11.

Here the strobe waveform has a first dc balancing portion 60, a blanking portion 62 and a discriminating portion 64. Again the line address time is two slots and the data waveforms are the same as schemes previously described. However the blanking portion 62 extends into the previous rows by a number of time slots, the length dc balancing portion 60 being equal to the number of slots by which the blanking portion is extended.

The dc balancing portion 60 not only ensures dc balancing but also serves to improve the efficiency of the blanking portion 62 by pre-stressing and pre-poling the liquid crystal material. The amount by which the strobe extends into the preceding rows may be greater than the line address time. If greater than the line address time it is possible that the dc balancing portion will be sufficient to latch the liquid crystal state into the opposite state to which it is to be blanked. This may have an effect on the efficacy of the blanking portion. However the liquid crystal material is also responding to the applied field and will, if a positive dielectric anisotropy liquid crystal material is used, tend to line up with the field which may counter this effect depending on the cell arrangement. The precise duration of the extension will be influenced by a number of factors such as effective operating window and contrast effects. The skilled person would be well aware of this and could readily determine an appropriate duration. Further the amount of extension may be varied to compensate for operating variations such as changes of temperature. FIG. 12 shows a graph of the total length of the blanking portion against the voltage required to latch. A number of pulses with a discriminating portion of 1 time slot and a blanking portion equal to y time slots were used. As can be seen increasing the blanking portion shows advantages in reduced latching voltage up to about 20 time slots in this example.

FIG. 13 shows (a) an unextended bi-polar strobe waveform, (b) a strobe waveform having a dc balancing portion of one time slot and a blanking portion of two time slots (i.e. the blanking portion has been extended by one time slot compared to that shown in FIG. 13*a*) and (c) a dc balancing portion of two time slots and blanking portion of three time slots. FIG. 14 shows the respective operating windows for the schemes. Again the temperature was 25° C. with a strobe voltage of 22.5V and a data voltage of 2V.

It can be seen that the fastest line address time is again increased with an extended scheme and the operating window, although reduced, remains relatively large.

In a further embodiment an additional amount of AC is applied before the blanking portion and dc balancing portion if present. As mentioned the effect of the AC field is to cause a liquid crystal material with a positive dielectric anisotropy to line up with the applied field thus increasing the flexoelectric polarisation. FIG. 15 shows three strobe waveforms that were applied with varying degree of AC before the blanking portion and FIG. 16 shows the results obtained. For this particular set of operating conditions it can be seen that the operating window of the cell has been improved.

FIG. 17 shows an embodiment of the invention wherein the strobe waveform has a first AC portion 66 preceding a dc balancing portion 60, a blanking portion 62 and a discriminating portion 64. FIG. 18 shows an embodiment similar to that shown in FIG. 17 but wherein the discriminating portion 64 is extended into the following rows and there is a final portion 68 which is of opposite polarity to help reduce the ionic effect during the remainder of the frame and also provide an additional means of dc balancing.

Whilst it is simpler in driving circuitry to minimise the number of voltage levels of the row drivers to three, $+V_s$, $-V_s$ and 0, the blanking portion need not be of the same voltage as the discriminating portion. FIG. 19 shows a strobe waveform suitable for use in the present invention where the blanking portion is of a lower amplitude than the discriminating portion but is of a longer duration. This ensures that the pulses of operating at different parts of the latching curves such as shown in FIG. 4. This could be of use where the temperature variation of the liquid crystal material is such that the black-white transition shows a marked temperature variation at low amplitude/ high duration pulses but the white black-transition varies most with temperature at high amplitudes/ low duration.

A summary of the results for various strobe waveforms is given in the table below. This table shows various strobe waveforms which are expressed in units of $V_s$. The slowest line address time (l.a.t.) which allows discrimination and fastest l.a.t. allowing discrimination are illustrated. The range is the ratio of the slowest l.a.t. to the fastest l.a.t. and gives and indication of the operating range. Where the strobe waveform has been illustrated in the drawings the reference is given as the results. The period of the line address time is indicated in bold.

The first waveform is the unextended strobe consisting of two pulses of opposite polarity and the next two waveforms show the effect of increasing both the blanking portion and the discriminating portion. An increase in speed for latching between states is observed but the operating range is reduced. The next two waveforms show extension of the blanking portion along with a dc balancing portion. Here the range is preserved and faster latching observed. The next two waveforms have a certain amount of ac biasing and, at these conditions, allow a greater operating range.

Finally the last two waveforms, which are similar to the generic waveform shown in FIG. 17, shows the effects of both an ac component and extension of the blanking portion with dc balancing. Here it can be seen that good ranges can be achieved with marked increases in speed.

| Strobe Waveform | Figure | Slowest l.a.t. (ms) | Fastest l.a.t. (ms) | Range | figure |
|---|---|---|---|---|---|
| 1, −1 | 9a | 0.75 | 1.5 | 2 | 10a |
| 1, 1, −1, −1 | 9b | 0.4 | 0.75 | 1.9 | 10b |
| 1, 1, 1, −1, 1, 1 | 9c | 0.3 | 0.425 | 1.4 | 10c |
| −1, 1, 1, −1 | 13b | 0.6 | 1.15 | 1.9 | 14b |
| −1, −1, 1, 1, 1, −1 | 13c | 0.5 | 0.95 | 1.9 | 14c |
| 1, −1, 1, −1 | 15b | 0.9 | 2.25 | 2.5 | 16b |
| 1, −1, 1, −1, 1, −1 | 15c | 0.95 | 2.1 | 2.1 | 16c |
| 1, −1, 1, 1, −1, −1 | Not shown | 0.45 | 0.8 | 1.8 | |
| 1, −1, 1, 1, 1, −1, −1, −1 | Not shown | 0.3 | 0.45 | 1.5 | |

Further results on addressing schemes according to the present invention were obtained using a cell of different geometry. Again a display such as described in WO97/14990 was used however in this cell the liquid crystal material had a twisted nematic geometry. That is, one surface had a grating designed to give zenithal bistability and the other surface was a conventional planar homogeneous surface formed, for example, by rubbing a polymer coated surface or using photo-alignment techniques. The preferred alignment direction (e.g. rubbing direction) of this other surface is set at an angle (90° in this example) to the orientation of the director at the other surface when in the defect state. In this cell, the defect state forms a twisted (90°) nematic configuration and the continuous (or non-defect) state forms a hybrid aligned or HAN geometry. The liquid crystal material used was the positive $\Delta\epsilon$ liquid crystal mixture MLC 6204 available from E Merck. The device was chosen to be 4.4 μm so that it operated in the first minimum configuration well known to those skilled in the art of TN LCDs. This allowed the device to be used either between crossed polarisers, or with parallel polarisers, to give good optical contrast between the states. All of the results shown here were taken with a crossed polariser configuration, so that the defect (TN) state was strongly transmissive (white) and the continuous (HAN) state appeared weakly transmissive (ie black). The following results were taken at 25° C. and used a 5V bipolar data waveform of two time slots.

FIG. 20 shows the operating window for the simple bipolar strobe waveform of FIG. 13(*a*). For these measurements a separate blanking pulse had been applied some milliseconds earlier. The effective data waveform applied to the column electrode consisted of 5V data waveform applied for a duration equal to 100 times the line address time before and after the line-address period for the pixel being studied. The worst case pixel pattern was used to measure the operating window, i.e. the select data was used when measuring the threshold curve for the "non-latching" resultant, and the non-select data was applied when measuring the threshold for the "latching" resultant. All intermediate pixel patterns were tested for the data immediately preceding and following the strobe waveform. For example, for the select resultant S, each of sSs, sSn, nSs and nSn were measured and for the Non-Select resultant N, measurements were made for nNn, sNn, nNs, and sNs (where s and n are the select and non-select data respectively). In this fashion, the conditions, ie time slot (half the l.a.t in a two slot scheme) and strobe voltage Vs under which the device would discriminate between the required states regardless of the image being displayed were found.

FIG. 21 shows the results when the test was repeated using a strobe waveform shown in FIG. 13(*b*) where the blanking portion has been pre-extended by one time slot and is immediately preceded by a dc balancing portion of one time slot. It can again be seen that the waveform of FIG. 13(*b*) clearly leads to a lower voltage/faster operation then that of FIG. 13(*a*) without any deleterious effects on the overall operating window.

FIG. 22 compares the operating for the operating windows for the unextended strobe of FIG. 13(*a*) and the pre-extended strobe of FIG. 13(*b*). The operating window 70 for the unextended strobe can be seen to be as wide as the operating window 72 for the extended strobe but at slower speeds and higher voltages.

FIG. 23 shows the transmission versus time characteristic of the pixel when the strobe waveform of FIG. 13(*b*) is applied to the pixel in three separate frames. In the first frame, the pixel is transmissive (white). The single waveform of FIG. 13(*b*) is applied that blanks the pixel black, and then, with the non select data applied in the line address period, remains black after this period in the first frame. In the second frame, the blank pulse maintains the black state, but selection occurs in the line address time due to the combined effect of the strobe and the select data applied in the line address time, thereby latching the pixel in to the desired white state. In the third and final frame, the pixel is again blanked black, and remains black due to the non-select data being applied. For reasons of clarity, the case where the pixel in the white state is blanked black and then immediately latched back into the white state is not shown in this figure.

This figure clearly demonstrates that the state of the pixel after the strobe in each frame is determined by the data applied during the line address time. As well as the improved voltage/speed of operation noted earlier, this type of operation also allows the highest contrast and brightness to be achieved, since each pixel spends the least time possible in the incorrect state. For example, a pixel that should be white between consecutive frames should only be blanked black for the shortest time, and this is immediately before the pixel is returned to its desired white state.

FIG. 24 shows the pixel pattern dependence of cell. Again the strobe waveform of FIG. 13(*b*) was used with select S or non-select N data waveforms being applied over four time periods each equal to the line address times. The first period corresponds to a data waveform on a column before the strobe is applied, the next period coincides with the strobe pre-extension being applied. The third period is the actual line address time for that pixel when the desired data waveform is applied and is followed by the final period where the data of the following line is applied. The data voltage was set at 5V and the line address time was 100 μs. The threshold voltages for latching from black to white are shown in FIG. 24(*a*). FIG. 24(*b*) shows the voltage for latching from white to black and finally FIG. 24(*c*) shows the threshold for reverse white to black latching. Reverse white to black latching occurs when the ionic effects that build up during the discriminating portion with a select data waveform that after removal of the field the ionic field is sufficient to cause the material to latch back into the black state. This effect can be reduced using a pulse of the opposite polarity immediately following the discriminating period, an embodiment described later in the present invention.

FIG. 25 shows a comparison of the operating windows of the bipolar strobe of FIG. 13(*a*) and a pre-extended strobe as shown in FIG. 11 where y is equal to 24, i.e. the blanking portion is 13 time slots long in total and the dc balancing portion is 12 time slots long. Again it can be seen that pre-extension of the strobe offers a reduction in voltage or faster operation as compared to a simple bipolar pulse but with a useful operating window.

Again using the strobe waveform shown in FIG. 11 the relationship between strobe pre-extension and line address time is shown in FIG. 26. The threshold strobe voltage against time slot (line address time is equal to two time slots in this scheme) is shown against increasing y, i.e. increasing the duration of the blanking portion and dc balancing portion. This clearly illustrates how the combined effect of the extended blanking portion and the adjacent dc balancing portion leads to substantially lower voltage and/or shorter line address times. For example, with 25 μs slots, pre-extending the blank from y=0 (prior art) to y=24 lowers the latching threshold from 50V to 36V. The results suggest that further improvements are possible for longer pre-extended strobe waveforms, although for this material and temperature, the extent of this improvement is diminishing as y is increased.

FIG. 27 shows the operating window 74 of a strobe according to FIG. 11 where y is equal to 24 (i.e. the blanking portion is 13 time slots long and the dc balancing potion is 12 time slots long) against the operating window 76 for a strobe waveform according to FIG. 9(*b*), i.e. a blanking portion of two time slots and a discriminating portion of two time slots. It can be seen that whilst the pre-extension offers a faster operation and lower voltage the strobe waveform of FIG. 9(*b*) has a much reduced operating window. Indeed the pixel pattern dependence of this waveform is much larger. This reduced operating window is likely to be too small for satisfactory performance of a practical device, particularly if the display has a large surface area.

FIG. 28 shows the operating window 70 of the simple bipolar strobe and the operating window of the strobe of FIG. 11 where y is equal to 24 time slots compared with that 82 of the strobe of FIG. 15(*b*), i.e. a strobe having ac poling (but no/reduced dc poling) for two time slots before the line address time. The ac poling offers a faster/ lower voltage operation than the simple bipolar strobe as expected due to the pre-stressing described earlier. However this waveform is very sensitive to pixel pattern dependence and hence the operating window is actually reduced by quite a degree. It can be seen that the pre-extended strobe with an extended blanking portion has a much better operating window and faster/lower voltage operation.

All the schemes described herein have been using a two slot data waveform. The skilled person would readily understand however that three or more slot data schemes could be used that the waveforms could include a part which is zero for some time or different magnitudes, for instance $-2V_d$, $+V_d$, $+V_d$. One suitable scheme is shown in FIG. 29. Here the data waveforms are three timeslots long and are either $+V_d$ for one time slot, $-V_d$ for the next time slot and zero for the final time slot, or the inverse. The strobe waveform has a blanking portion 62 which applies for the first time slot of the line address time and is pre-extended for a few time slots before the line address time. The discriminating portion 64 lasts for two time slots and there is also a dc balancing portion.

Preferably in such a scheme the field reversal in the strobe during the line address time is synchronised with the field reversal in the data waveform. This design gives two slots of the strobe to latch the cell, thereby leading to a faster or lower voltage latching. An advantage of using this kind of strobe over simple pre-extension is that as the data voltage is zero for the last time slot so that the latching portion always has the same amplitude irrespective of the data on the preceding line. This means that there is a lower pixel pattern dependence and therefore a wider operating range.

It is noted that a combination of the waveforms described herein may be used to provide a wide range of operating conditions, any particular waveform being used to give the required speed, voltage and operating window for a given set of conditions. FIG. 30 shows three strobe waveforms that may be used at different conditions, such as varying temperature. FIG. 30(*a*) shows a strobe as hereinbefore described with a pre-extended blanking portion and dc balancing portion. Were the temperature of the device to increase the waveform of FIG. 30(*b*) might be used which is of the same basic form but with reduced pre-extension. Finally at high temperatures the waveform of FIG. 30(*c*) might be used. Note that the blanking portion and discriminating potion do not necessarily need to fill the entire line address time. It should also be noted that the waveform in FIG. 30(*c*) requires the liquid crystal device to display an asymmetric latching response whereas the waveforms shown in FIGS. 30(*a*) and (*b*) have sufficiently wide blanking portions that they could be used in devices with symmetric latching responses. Alternatively, at the high temperatures, the waveform of FIG. 30(*c*) might be used in conjunction with a separate blanking waveform, or two field method, according to the prior art.

FIG. 31 schematically illustrates how the waveforms of FIG. 30 could be used to operate over the widest possible operating window. The display would then include a temperature sensing element, and the control unit then alters the strobe and data waveforms applied to ensure operation across the complete temperature range. For the range indicated in FIG. 31, there is no need to alter either Vs, Vd or the duration of the time slot, merely altering the strobe waveform as indicated.

Where the strobe waveform is greater than the line address time as described above it may be advantageous to address the display array in a manner other than by subsequently addressing adjacent lines. FIG. 32 shows a scheme for addressing in a particular sequence. Here the strobe waveform has a duration equal to three line address times. It has a dc balancing portion 60 of one time slot followed by a blanking portion 62 of three time slots followed by a discriminating portion of two time slots. Row n is addressed at a certain time. Row n+1 is then addressed a time equal to three line address times later. This means that the driver 90 driving both row n and row n+1 only has a non zero output on one row at a time. Meanwhile after row n has been addressed a different row, driven by a different driver 92, is addressed. In this example it could be row n+4. This avoids the need for utilising drivers to drive non-zero outputs on more than one row simultaneously which has advantages in construction and allows commercial electronic drivers designed for RMS (STN) addressing to be used.

All of the embodiments described herein have used bistable devices. Multistable devices could with more than two states may be used with an appropriate number of data waveforms for the number of stable states. The data waveforms could then have different amplitudes, for instance three different two slot data waveforms for a tristable device could be (0,0), $(+V_d, -V_d)$, $(+2V_d, -2V_d)$ or similar. Alternatively or additionally the phase of the data waveforms could be altered so that the resultant when combined with the discriminating portion of the strobe waveform is varied.

The present invention can be implemented using a range of driving circuitry. However it would be advantageous to use commercially available electronic device drivers presently used to address STN devices, termed STN drivers, as such drivers are readily available at low cost and high reliability. In another aspect of the invention therefore the addressing scheme is implemented using STN drivers.

FIG. 33 shows how a zenithal bistable display can be connected to standard STN drivers. For illustrative purposes a 320 by 320 pixel display 303 is driven by two 160 segment (column) drivers 304 and two 160 common (row) drivers 305.

The host microcontroller 301 runs the application software for the particular display application. When a new image is required a display image is written to the RAM of the microcontroller via a display routine. Display control software then reads the bitmap stored in the display RAM and writes it to a display module, taking temperature compensation into account.

The microcontroller 301 provides each common (row) driver 304 with a clock signal ROW_CLK which clocks the driver's shift register. The SYNC signal is input to the shift register and ripples through the shift register to select each active row in turn.

Each common (row) driver also has a DISPOFF input which disables the drivers when the input is low, i.e. a DISPOFF signal of logic 1 enables the drivers and a signal of logic 0 disables the drivers.

Each driver also receives a modulation signal M. Changing the level on this signal inverts the output voltages generated by the row and column drivers as will be described in more detail below. In driving an STN device the M signal is used to maintain DC balance. The M signal for the row drivers M_ROW may be connected to the same I/O port of the microcontroller 301 as for the columns M_COL.

The column drivers 305 also receive a clock signal DATA_CLK and an M signal. Data is supplied to the driver on parallel lines D0 . . . D7 (for an eight bit driver). The latch pulse signal LP is used by the segment (column) driver to transfer the column data from the input shift register to the output data register.

When connected to a matrix display conventional STN drivers are capable of outputting one of six different voltage levels, referred to as V0, V1, V2, V3, V4 and V5. V5 is usually the lowest output voltage and in this arrangement is connected to ground (0V). V0, the highest output, is also referred to as $V_{LCD}$. V1, V2, V3 and V4 are generated by the LCD power supply circuitry 302 for example either using a buffered resistor ladder arrangement (with fixed or programmable bias voltage) or by generating a fixed voltage and using op-amps to multiply and/or subtract the various voltages.

It will be apparent that this arrangement allows any one driver to output voltages of one polarity only and as mentioned bistable liquid crystal devices require polarity dependent switching. The addressing scheme therefore relies on an appropriate voltage being supplied to the row and the column for each pixel to create a voltage resultant of the correct polarity. For instance, using the convention that the resultant voltage at any pixel is equal to the voltage on the relevant row minus the voltage on the relevant column, if the row voltage was +22V and the column voltage was 0V the resultant would be +22V. However with a voltage of 0V on the row and +22V on the column the resultant is −22V. Therefore both positive and negative resultants can be achieved by appropriate application of voltage to both the rows and the columns.

It will be appreciated that although a positive voltage, +Vs say, can be implemented by applying Vs to the row, generating a negative resultant requires a voltage of at least Vs to be generated on the column.

It would be possible to arrange a driver to be able to output both positive and negative voltages but STN drivers have a maximum operable voltage range. Therefore a 24V driver can only create a maximum difference in output of 24V. This could be arranged so that the output varies from +12V to −12V utilising the full 24V range. The row driver could then be arranged to output a +Vs of +12V and a −Vs of −12V. However if instead the row driver output 0V to 24V and it was combined with a column driver of the same range the resultant range of −24V to +24V could be achieved, i.e. a range of 48V. Therefore using STN drivers in this manner reduces the voltages that have to be applied to the rows for addressing whilst maintaining a large voltage swing.

The values of V0 to V5 are then arranged to provide selective switching as described previously. The voltage levels are generally calculated in terms of Vs and Vd. V0 (or $V_{LCD}$) is the highest output and so is equal to Vs+Vd. The relationship of the other voltage levels is shown in table 1 below

TABLE 1

| Name | Relationship (n = bias ratio) | Relationship Vlcd & Vd | Relationship to Vs & Vd | Example value ($V_{LCD}$ = 22 V, Vd = 3 V) |
|---|---|---|---|---|
| V0 | $V_{LCD}$ | $V_{LCD}$ | Vs + Vd (latches pixel) | 22 V |
| V1 | $V_{LCD\times(n-1)/n}$ | $V_{LCD}$ − Vd | Vs | 19 V |
| V2 | $V_{LCD\times(n-2)/n}$ | $V_{LCD}$ − 2Vd | Vs − Vd (does not latch pixel) | 16 V |
| V3 | $V_{LCD\times2/n}$ | 2 Vd | 2x Vd | 6 V |
| V4 | $V_{LCD\times1/n}$ | Vd | Vd | 3 V |
| V5 | 0 V | 0 V | 0 V | 0 V |

Each of the row and column drivers actually only outputs any four of these voltage levels. The row drivers are provided with voltage levels V0, V1, V4 and V5 and the column drivers with V0, V2, V3 and V5. The voltages generated by the row (common) and column (segment) drivers have a standard relationship to the row or column data value, the value of the M signal and the DISPOFF signal as summarised in table 2 below where H indicates a high value (logic 1) and L a low value (logic 0).

TABLE 2

| DISPOFF | Row/Column data | M/ FR | Row (Common) driver output | Column (Segment) driver output |
|---|---|---|---|---|
| H | L | L | V4 ( | V3 |
| H | L | H | V1 | V2 |
| H | H | L | V0 | V5 |
| H | H | H | V5 | V0 |
| L | x | x | V5 | V5 |

Table 2 can be re-arranged to show the pixel resultants in terms of V0 . . . V5, Vs and Vd and also example voltages as shown in FIG. 37.

An active row, i.e. the row being addressed, is selected by applying an H signal to that row and an L signal to all the other rows. Thus when M is high the active row is at a voltage of V5 (0V) and when M is low the active row is at V0 (Vs+Vd). The column drivers receive the same M signal but the voltage output depends on the column data applied. A high M signal (during which the row voltage is 0V) with a column data H gives an output on the relevant column of V0 (Vs+Vd). The resultant, the row voltage minus the column voltage, is then −(Vs+Vd) which would latch the pixel to one state. If M was high and the column data was low the column voltage would be V2 (Vs−Vd) and the resultant would be −(Vs−Vd) which would be insufficient to cause latching. Similarly if M was low (the active row is at Vs+Vd) a high data signal on the column driver (column at V5=0V) gives a resultant of +(Vs+Vd) which would cause latching to the other state and a low data signal on the column driver (output at V3=2Vd) gives a resultant of +(Vs−Vd) which would not cause latching.

This illustrates that for an active row (data on the row is high) a data of logic 1 (H) on the column data gives a switching resultant and a data of logic 0 (L) on the column data gives a non-switching resultant. The polarity of the resultant depends on the M signal and changing the M signal effectively changes the polarity of the resultant. Thus a bipolar pulse can be achieved by changing the M signal without actually changing the data on either the row or the column drivers.

For a non-active row (i.e. the row data is L) the row is held at a voltage of V1 (Vs) when M is high and V4 (Vd) when M is low. The select data on the column, i.e. column data is H, gives a column output of V0 (Vs+Vd) and V5 (0V) when M is high and low respectively leading to respective resultants of −Vd and +Vd. The non-select data (L) on the column driver gives an output of V2 (Vs−Vd) and V3 (2Vd) respectively leading to resultants of +Vd and −Vd respectively.

It should be clear therefore that on all non-active rows the resultants will be +Vd or −Vd whatever the column data which obviously will not cause latching. For an active row a latching resultant can be achieved by applying a data 1 to the appropriate column data and a non-switching resultant by applying a data 0. The polarity of each of the resultants can be inverted by changing to M signal from a 1 to a 0 or vice versa.

Therefore any of the resultant waveforms described above can be implemented using this aspect of the invention with the exception of waveforms which have a 0V resultant at any time—it will be apparent that it is not possible to achieve a 0V resultant without disabling an entire driver through use of the DISPOFF signal.

For instance consider the waveforms shown in FIG. 7. Here the strobe waveform is −Vs for one slot and +Vs for a second slot. A select data waveform is +Vd for one slot followed by −Vd for the second and the non-select data waveform is the inverse. Imagine addressing a 2×2 pixel grid with this scheme. As described above row 1 would be addressed with the strobe waveform whilst row 2 was held at zero. A select data pulse may be applied to the first column whilst a non select data pulse was applied to the second column.

Using STN drivers the driver would receive a data 1 for row 1 throughout the two time slots to maintain it as the active row but after one time slot the M signal would switch from 1 to 0. Row 2, non active during this period receives data 0. The pixel in column 1 is receiving the select data and so the column data is 1, again through the whole period although as mentioned M does change after the first slot. As seen above this means the resultant voltage for the pixel at row 1 for the first time slot (M=1, Row data=1, Col data=1) is −(Vs+Vd). In the second slot (M=0, Row data=1, Col data=1) the resultant is +(Vs+Vd). Therefore the resultant voltage waveform at the pixel is the same as if the waveforms shown in FIG. 7 had been applied. The pixel in row 2 (Row data=0, Col data=1) experiences a resultant voltage of −Vd when M is 1 in the first time slot and +Vd when M is 0 in the second time slot and so again the resultant is identical to what would have been experienced. A similar analysis for the column 2 would show again that the resultants are identical.

Therefore the STN drivers create on each pixel on an active row a voltage resultant which has a blanking portion (latches each pixel to one stable state) immediately preceding a discriminating portion which selectively latches to the other stable state or not depending on the data for the particular column. On the non-active rows the voltage resultant for all pixels is insufficient to latch the pixel away from the stable state it is in.

One can therefore think of the driving scheme of the present invention as akin to using voltage reduction waveforms, i.e. the actual voltage waveforms applied to the rows can be obtained by taking the addressing scheme of FIG. 7 and applying a voltage modulation to the waveform for each row (the same modulation being applied to each row) and also applying a corresponding voltage modulation to each column, the effect of the modulation being to reduce the maximum voltage amplitude applied to any row or column.

It will be apparent to one skilled in the art that the use of STN drivers requires careful arrangement of the voltages on the rows and columns to achieve the desired resultants and that during the line address time of one row a voltage waveform is applied to all other rows (as mentioned this can be seen as being akin to a voltage reduction waveform applied to the strobe and data waveforms previously described). This means however that the strobe for one row can not extend beyond the line address time for that row as described in some embodiments above.

The skilled person would be well aware of the various STN drivers which could be used to implement the present invention. Typical STN drivers, i.e. passive matrix common and segment drivers include the following; Samsung S6B0741, S6B1713 and s1d0605; Solomon Systech SSD1701; Novatech NT7701 and NT7702, Seiko Epsom S1D17A03. The skilled person would be well aware of the type of drivers termed STN drivers (or five level drivers) and all have the same basic characteristics as discussed above. However for some devices the pin names used vary from those described above (although they have the same function). Table 3 below compares the pin names described above and shown in FIG. 33 with those used by some common device manufacturers.

Where [COM] or [SEG] is indicated, this reflects the COMmon or SEGment mode of operation of a dual Common/Segment driver IC.

TABLE 3

| Pin Name | Novatek | Epson | Samsung |
|---|---|---|---|
| M | FR | FR | FR |
| SYNC | EIO1[COM] | EIO1, DIO1 | EIO1 |
| ROW_CLK | LP[COM] | LP[COM], YSCL | LP[COM] |
| LP | LP [SEG] | LP[SEG] | LP[SEG] |
| D0 . . . D7 | DI0 . . . DI7 | D0 . . . D7 | D0 . . . D7 |
| DATA_CLK | XCK | SCL, XSCL | XCK |
| DISPOFF | DISPOFF | DSPOF | DISPOFFB |
| SHL | SHL[COM] | SHL | L/R |

FIG. 34 illustrates the data inputs/outputs on voltage waveforms in an addressing scheme of the present invention using STN drivers.

Time period 3401 represents the line address time for the first row, time period 3402 that for the second row and so on. In the present example the line address time is six time slots long although other schemes could of course be used. The row signals Row SR(1), Row SR(2) and Row SR(3) indicate the data signal for rows 1, 2 and 3 respectively. It can be seen that during time period 3301 the signal on row 1 is high (logic 1) and that row is active whilst the signal on rows 2 and 3 is low (logic 0). In time period 3402 the data for row 2 is high and all other rows are low. In this manner the rows are selected sequentially, the active row being changed by the clock signal ROW_CLK.

Note that the row data for an active row is held at logic 1 throughout the whole of the relevant line address time but the M signal is changed twice during each line address time, between the second and third time slots and also between the fifth and sixth time slots. This changes the voltage output on the row from high to low to high or vice versa depending whether it is an active row or now. The output voltages on rows 1 and 2 are shown by the signals Row Driver 1 o/p and Row Driver 2 o/p.

The column data on lines D0 . . . D7 are clocked into the input shift register on the DATA_CLK signal. The LP signal then causes transfer of the information to the output register.

The column data is arranged, in this example, to blank the pixel into a white state in the first four time slots and then either latch or not latch to the black state in the last two time slots. For pixel intended to be white the column data is logic 1 for the first 4 time slots and then logic 0 for the last two time slots. For a pixel to be latched black the column data is logic 1 for all six time slots.

The resultant column outputs are shown for latching white and black; White Col Drv o/p and Black Col Drv output. As the black column is logic 1 all the time the signal changes from low to high to low with the change in M. This results in a resultant voltage on the active row shown as Black Pixel Row 1. The voltage starts at +(Vs+Vd) which as discussed previously provides dc poling of the liquid crystal material. Between time slots 2 and 3 the M signal changes with no change to the data on the row or column. This inverts the voltage level to −(Vs+Vd). This blanks the pixel into the white state. Between time slots five and six the M signal is changed again but again there has been no change to the column data and so the voltage is switched back to +(Vs+Vd) which latches the pixel into the black state.

For a pixel intended white the data on the column is again logic 1 for the first four time slots which, on an active row as illustrated by White Pixel Row 1, results in a switch from +(Vs+Vd) to −(Vs+Vd) between time slots 2 and 3 blanking the pixel white. At time slot five however the data on the column changes to logic 0 but there is no change in the M signal. Thus the voltage resultant level is still of negative polarity but is reduced to −(Vs−Vd). At time slot 6 the change in the M signal inverts the resultant voltage to +(Vs−Vd). This swing is insufficient to latch the pixel and so the pixel remains white. Thus in a six slot switching scheme the row may be blanked and selectively addressed.

As the column data changes from logic 1 to logic 0 during the line address time column data has to be loaded into the input register twice per line address time. During the first four time slots of the line address time, the selective data is clocked into the input register and then transferred to the output register at the falling edge of a first latch pulse (LP). Then during the last two time slots, the selective portion of the addressing cycle, the shift register needs to clock in the new column data (i.e. all logic 1) for the first part of the next data waveform. At present there is a limit to how fast one can clock in the data to the input register. Given this needs to be clocked in twice the fastest possible line address time would be twice the speed at which the data can be read into the driver. Further updating the column data is a significant power consumption in the writing process and reducing the number of updates reduces the power requirement.

An alternative scheme is shown in FIG. 35 in which column data only need to be read into the driver once per line address time. In this example the M signal and row data are the same as described above with reference to FIG. 34. Also the data for switching to a black pixel is logic 1 for all six time slots and so the voltage resultant is the same as previously described. For a white pixel the column data is logic 0 for all six time slots. This results in an initial resultant voltage on an active row of +(Vs−Vd). As the data on the column is not changed during the line address time the only modulation is supplied by the change in M signal and so between time slots 2 and 3 the resultant changes to −(Vs−Vd) and between time slots 5 and 6 the resultant voltage changes back to +(Vs−Vd).

It will be apparent that in this scheme the voltage resultant at a pixel to be latched white does not exceed |Vs−Vd|. However it will be remembered that latching of a liquid crystal material depends not only on the voltage level applied but also on the duration of the pulse. Thus a voltage of −(Vs−Vd) applied for two time slots may be sufficient to latch to the white state white a voltage of +(Vs−Vd) for one time slot is insufficient to latch to the black state. The duration of the blanking portion can be set as necessary to allow blanking. Additionally or alternatively the liquid crystal device may be designed so that it requires less energy to latch from the black to the white state than the other way round. Thus a voltage of −(Vs−Vd) may be sufficient to latch to the white state whereas a voltage of +(Vs−Vd) is insufficient to latch to black again allowing discrimination.

Therefore an addressing scheme using STN drivers can be designed where the data on the column is the same throughout the addressing period thus needing only one read operation and modulation is achieved by modulation of the M signal.

The scheme may also be used to perform partial update of a device. Where only part of a device is to be updated the panel could be quickly scanned with waveforms on the rows and columns that do not cause latching until the start line for an addressed block is reached. At this point the block is addressed to update the image as described above. The rest of the device could then again be quickly scanned to complete the frame. It should be noted that there could be more than one separated blocks to be updated.

As mentioned above the microcontroller may perform temperature compensation in response to changes in temperature of the liquid crystal device as monitored by an embedded temperature sensor. As the temperature changes the time/voltage characteristics of the liquid crystal material changes. At lower temperatures the liquid crystal material needs more time and/or a greater voltage to latch between states. Therefore the microcontroller can change the maximum voltage level, $V_{LCD}$, and/or the line address time to compensate for any temperature changes. It may also swap between an addressing scheme as described with reference to FIG. 34 and that described with reference to FIG. 35. The microcontroller may therefore be provided with a look up table to inform operation at different temperature. FIG. 36 illustrates the various modes of operation with the variation in line address time with temperature being shown by curve AEFGH.

For example imagine a liquid crystal device is designed for operation at room temperature and has 22V range drivers and a microprocessor which can update the column driver register in 100 microseconds. At room temperature the device may be designed to operate using a scheme as shown in FIG. 34, i.e. requiring data update twice during the line address time. This requires a line address time of at least 200 microseconds to allow the data update but ensures the blanking pulse is at a level of |Vs+Vd| possibly reducing the maximum voltage that need be supplied. The microprocessor may then have a look up table for the appropriate value of $V_{LCD}$ for the measured temperature, say 17V. $V_{LCD}$ would then be set to this voltage. As the other voltages are derived from $V_{LCD}$ they are set automatically.

If the temperature went down the voltage level $V_{LCD}$ could be increased to compensate until the maximum value of 22V was reached. After this stage has been reached the line address time could be increased to allow for decreased temperature. This is illustrated in FIG. 36. Between temperature T1 and T2 any temperature change is principally compensated for by a change in voltage and the effect on line address time is minimal. Below T1 however the voltage can not be increased any further and the line address time is increased in line with the liquid crystal temperature dependence (curve AB).

If however the temperature increased the level of $V_{LCD}$ could be dropped to compensate. The drivers do however have a minimum operating voltage, say 7V. Therefore $V_{LCD}$ can not be dropped below this voltage level. If the temperature went higher than could be compensated for by voltage reduction alone (T2) the line address time would have to be shortened to compensate. At some point above this temperature the addressing scheme may shift to that shown in FIG. 35 to reduce the number of data updates to one and therefore potentially decrease the line address time to 100 microseconds. Thus when the temperature increases above T2 the minimum voltage level has been increased and the line address time is shortened to compensate. At a temperature of T3 though the line address time, t1, is not long enough to allow separate loading of a data value for the blank portion and a data value for discriminating portion. Therefore above T3 the device switches to a scheme where only one data value is loaded per line address time. The allows the line address time to be further shortened until finally T4 is reached where the line address time is as short as it can be. Above T4 the line address time can not be shortened any further. It can be seen though that the switch between addressing schemes has extended predictable switching to T4.

Note in the discussion above shortening or extending the line address time may shorten or extend the blanking portion more or less than the discriminating portion as required, that it the whole waveform need not be simply scaled up or down.

The present invention therefore also allows use of STN drivers to address bistable nematic liquid crystal devices. Any of the waveforms of the present invention can be implemented using STN drivers—with the exception of those which require a zero voltage resultant and bearing in mind that the strobe must be applied during the line address time. However STN drivers could implement resultant waveforms that use any of the advantages of ac poling, dc poling and ionic reduction as described herein.

It should be noted that whilst all of the embodiments shown have used zenithal bistable devices the invention is equally applicable to azimuthally bistable devices such as described in European patent EP0744041 or U.S. Pat. No. 5,796,459.

Other embodiments and schemes of the present invention will be apparent to the skilled person and this invention is not restricted to any of the embodiments shown herein.

The invention claimed is:

1. A method for addressing a bistable nematic liquid crystal device having a layer of nematic liquid crystal material disposed between two cell walls and row and column electrodes disposed on the cell walls to form an addressable matrix of pixels, the liquid crystal material being latchable between two stable molecular configurations upon application of appropriate voltage pulses and having at least one row driver for applying voltages to said row electrodes and at least one column driver for applying voltages to said columns, the method comprising the steps of;

each said row driver supplying an active row voltage waveform to each row electrode sequentially for a line address time whilst simultaneously supplying a non-active row voltage waveform to every other row electrode for the line address time each said column driver supplying one of two data voltage waveforms to each column electrode simultaneously during the line address time, wherein said row and data voltage waveforms are such that the resultant voltage waveform at each pixel on the active row has a blanking portion that causes the liquid material to be latched to one stable state and a discriminating portion that causes the liquid crystal material to be selectively latched or not to the other stable state depending on the data voltage waveform applied to that column and wherein said blanking portion immediately precedes said discriminating portion, and such that the liquid crystal material at each pixel on a non-active row is not latched from its current stable state, and wherein the resultant voltage waveform at each pixel is dc balanced over the line address time.

2. A method as claimed in claim 1 wherein the row and column drivers are STN drivers.

3. A method as claimed in claim 1 wherein each row and column driver has a binary M signal input and changing the value of the M signal input to both the row and column values inverts the polarity but maintains the amplitude of the resultant voltage at a pixel.

4. A method as claimed in claim 3 wherein the M signal value is changed at least twice during the line address period.

5. A method as claimed in claim 3 wherein each column driver has a data output register for storing a binary column data value for a column and the voltage supplied by the column driver to a particular column is one of four preset voltage levels depending on the value of the column data value and the value of the M signal and each of the two data waveforms are generated by modulating the value of the column data value and/or the M signal.

6. A method as claimed in claim 5 wherein the column data value is updated during the line address period.

7. A method as claimed in claim 6 wherein the column data value generating the two data waveforms is the same during the blanking portion and different during the discriminating portion.

8. A method as claimed in claim 5 wherein the column data value is unchanged during the line address period and the column data value generating the two data waveforms is different.

9. A method as claimed in claim 5 wherein, when operating at a first temperature, the column data value for each column is updated during the line address period and, when operating at a second temperature, the column data value for each column is unchanged during the line address time.

10. A method as claimed in claim 9 wherein the first temperature is lower than the second temperature.

11. A method as claimed in claim 1 wherein the method involves the step of altering at least one of the duration of the blanking portion, the duration of the discriminating portion, the update rate of the column data values and the shape of the resultant waveform in order to compensate for temperature variations.

12. A method as claimed in claim 1 wherein the resultant voltage waveform at each pixel on the active row further comprises at least one of a dc poling portion preceding the blanking portion, an ac poling portion preceding the blanking portion and a ionic reduction portion following the discriminating portion.

13. A bistable nematic liquid crystal device comprising;

a layer of liquid crystal material sandwiched between two cell walls, the liquid crystal material being latchable between two stable states on application of appropriate voltage pulses, row and column electrodes disposed on the cell walls to form an addressable matrix of pixels, at least one row driver and at least one column driver, said at least one row driver being adapted to supply an active row voltage waveform to each row sequentially for a line address time whilst supplying a non-active row voltage waveform to the other rows, said at least one column driver having a data input and being adapted to supply simultaneously during the line address time one of two data voltage waveforms to each column electrode based on the data input for that column, said row and date voltage waveforms being such that the resultant voltage waveform at each pixel on the active row has a blanking portion that causes the liquid crystal material to be latched to one stable state and a discriminating portion that causes the liquid crystal material to be selectively latched or not to the other stable state depending on the data voltage waveform applied to that column electrode wherein said blanking portion immediately precedes said discriminating portion, and such that the liquid crystal material at each pixel on a non-active row is not latched from its current stable state, and wherein said resultant voltage waveform at each pixel is dc balanced over the line address time.

* * * * *